(12) United States Patent
Lee

(10) Patent No.: US 12,120,294 B2
(45) Date of Patent: *Oct. 15, 2024

(54) METHOD OF ENCODING/DECODING VIDEO SIGNAL USING INTRA PREDICTION AND APPARATUS THEREFOR

(71) Applicant: Apple Inc., Cupertino, CA (US)

(72) Inventor: Bae Keun Lee, Seongnam-si (KR)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,998

(22) Filed: Jun. 16, 2023

(65) Prior Publication Data

US 2024/0031556 A1  Jan. 25, 2024

Related U.S. Application Data

(63) Continuation of application No. 17/049,289, filed as application No. PCT/KR2019/016495 on Nov. 27, 2019, now Pat. No. 11,729,376.

(30) Foreign Application Priority Data

Nov. 27, 2018 (KR) .......................... 1020180148931

(51) Int. Cl.
*H04N 19/105* (2014.01)
*H04N 19/107* (2014.01)
(Continued)

(52) U.S. Cl.
CPC ......... *H04N 19/105* (2014.11); *H04N 19/107* (2014.11); *H04N 19/132* (2014.11);
(Continued)

(58) Field of Classification Search
None
See application file for complete search history.

(56) References Cited

U.S. PATENT DOCUMENTS 11,729,376 B2    8/2023  Lee
2017/0374369 A1* 12/2017 Chuang ................. H04N 19/70
(Continued)

FOREIGN PATENT DOCUMENTS

CN    106031176    10/2016
CN    108353185     7/2018
(Continued)

OTHER PUBLICATIONS

Benjamin Bross et al., CE3: Multiple reference line intra prediction (Test 5.4.1, 5.4.2, 5.4.3 and 5.4.4), JVET-K0051-v1, Joint Video Experts Team (JVET) of ITU-T SG 16 WP 3 and ISO/IEC JTC 1/SC 29/WG 11. 11th Meeting: Lijubljana, SI, Jul. 2, 2018, pp. 1-10.

(Continued)

*Primary Examiner* — Chikaodili E Anyikire
(74) *Attorney, Agent, or Firm* — Fish & Richardson P.C.

(57) ABSTRACT

A video decoding method according to the present disclosure includes determining a reference sample line for a current block, deriving an intra prediction mode for the current block, and performing intra prediction of the current block based on the reference sample line and the intra prediction mode.

15 Claims, 11 Drawing Sheets

(51) Int. Cl.
  *H04N 19/132* (2014.01)
  *H04N 19/159* (2014.01)
  *H04N 19/176* (2014.01)
  *H04N 19/46* (2014.01)

(52) U.S. Cl.
  CPC ......... *H04N 19/159* (2014.11); *H04N 19/176* (2014.11); *H04N 19/46* (2014.11)

(56) References Cited

U.S. PATENT DOCUMENTS

| | | |
|---|---|---|
| 2018/0316918 A1 | 11/2018 | Drugeon et al. |
| 2018/0324418 A1* | 11/2018 | Koo .................... H04N 19/147 |
| 2018/0332284 A1 | 11/2018 | Liu et al. |
| 2019/0116381 A1 | 4/2019 | Lee et al. |
| 2020/0244956 A1 | 7/2020 | Lee et al. |
| 2021/0006799 A1 | 1/2021 | Lee |
| 2021/0176492 A1 | 6/2021 | Kim |
| 2021/0243429 A1 | 8/2021 | Lee |
| 2021/0289229 A1 | 9/2021 | Ahn |

FOREIGN PATENT DOCUMENTS

| | | |
|---|---|---|
| JP | 2018-152852 | 9/2018 |
| KR | 10-20180041575 | 4/2018 |
| KR | 10-20180123674 | 11/2018 |

OTHER PUBLICATIONS

International Preliminary Report on Patentability in International Appln. No. PCT/KR2019/016495, dated May 25, 2021, 13 pages (with Machine Translation).

International Search Report and Written Opinion in International Appln. No. PCT/KR2019/016495, dated Mar. 25, 2020, 16 pages (with Machine Translation).

\* cited by examiner

[FIG. 1]
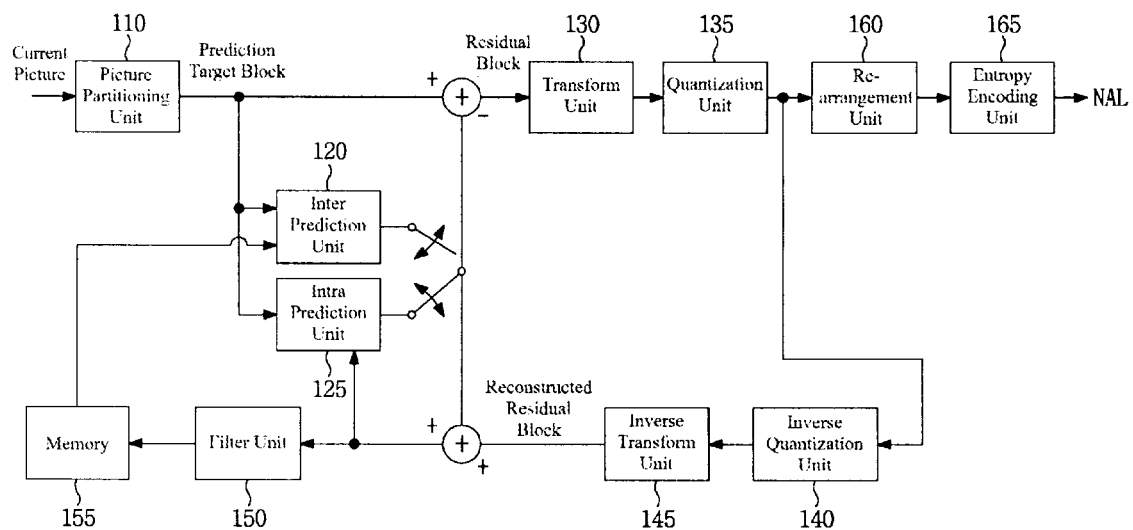
[FIG. 2]
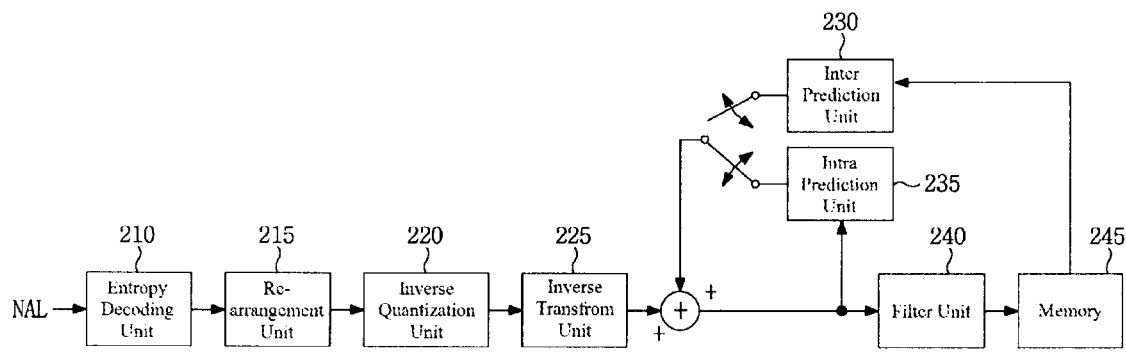

【FIG. 3】
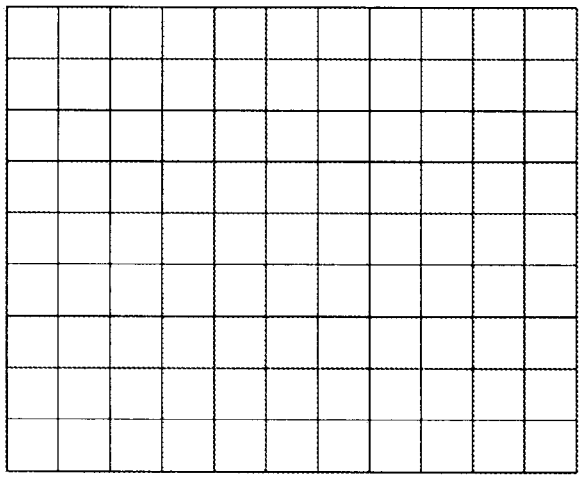
【FIG. 4】
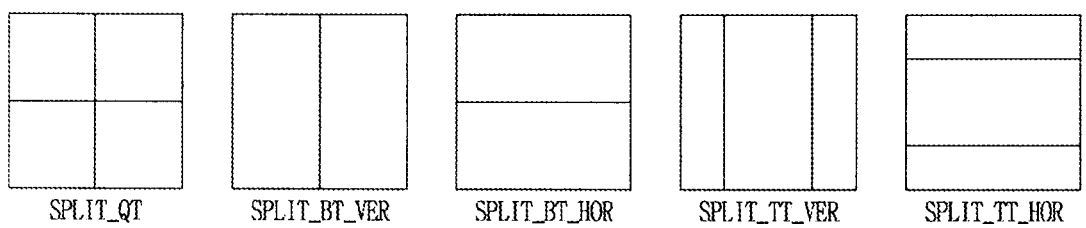
【FIG. 5】
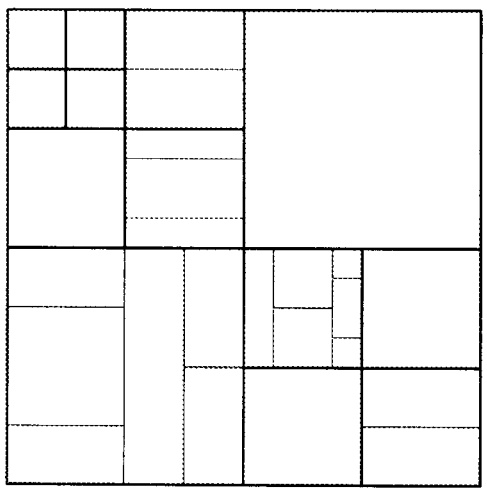

[FIG. 6]
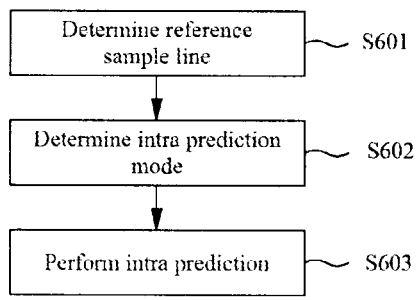
[FIG. 7]
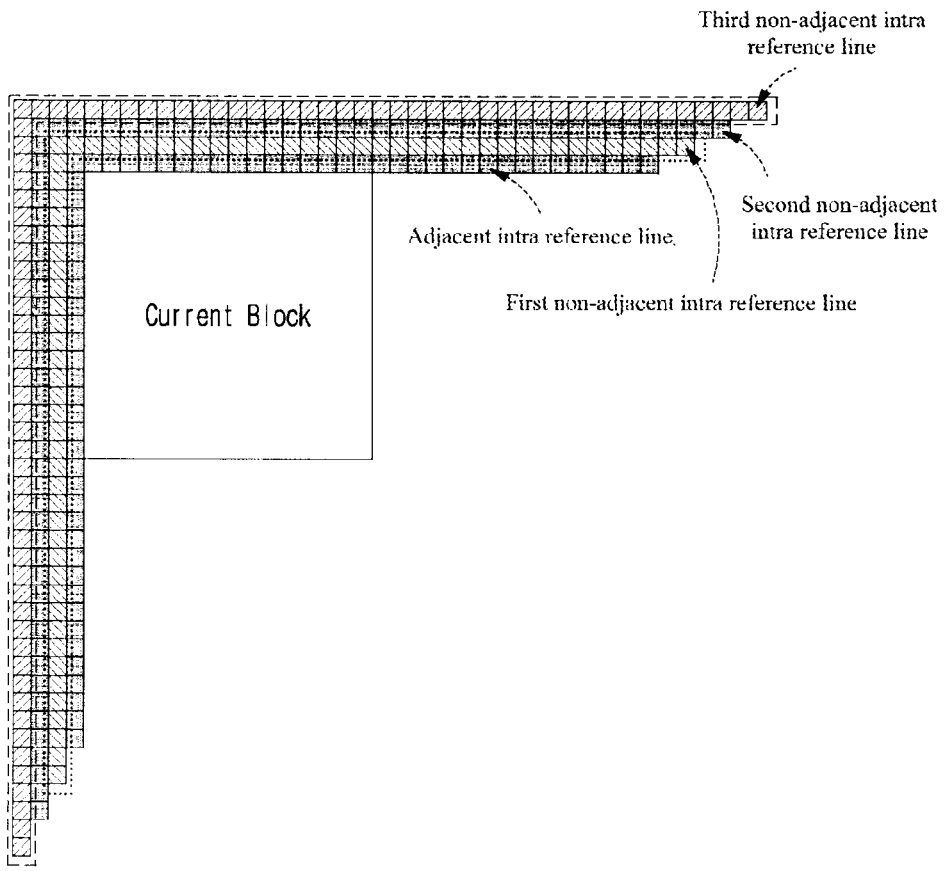

[FIG. 8]
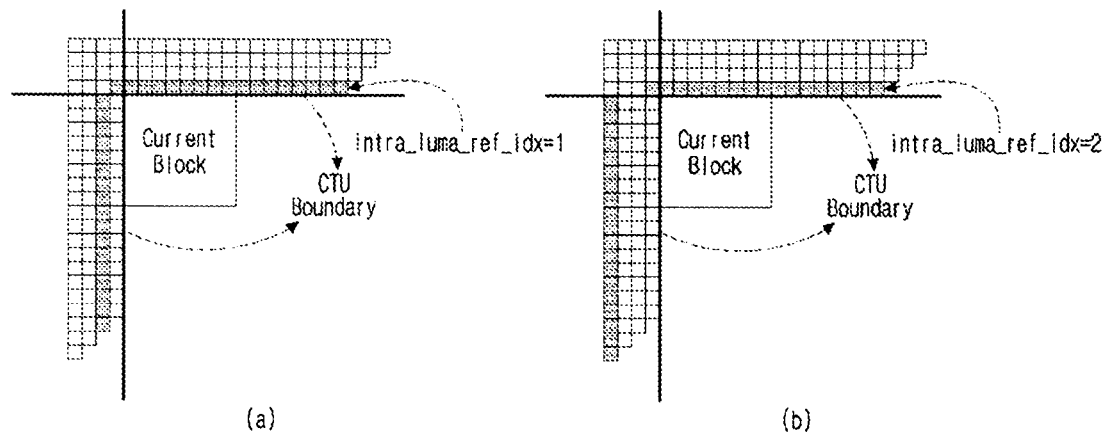
(a)  (b)
[FIG. 9]
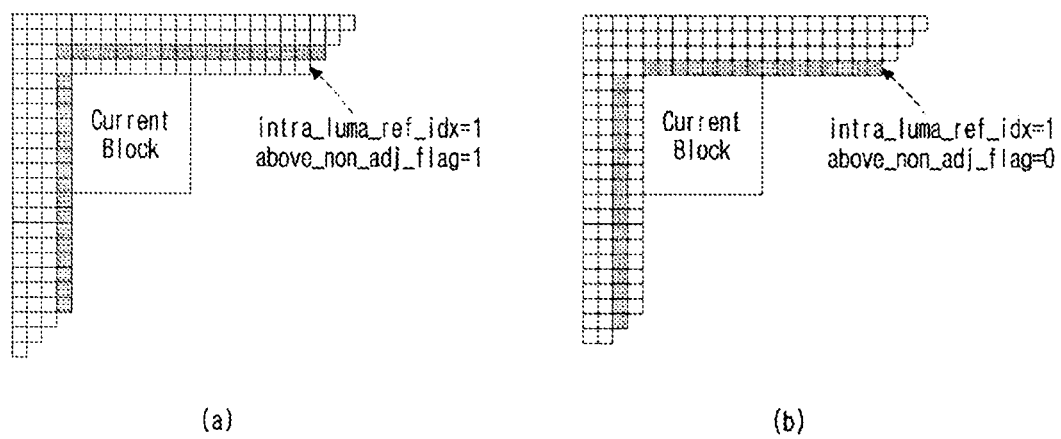
(a)  (b)

[FIG. 10]
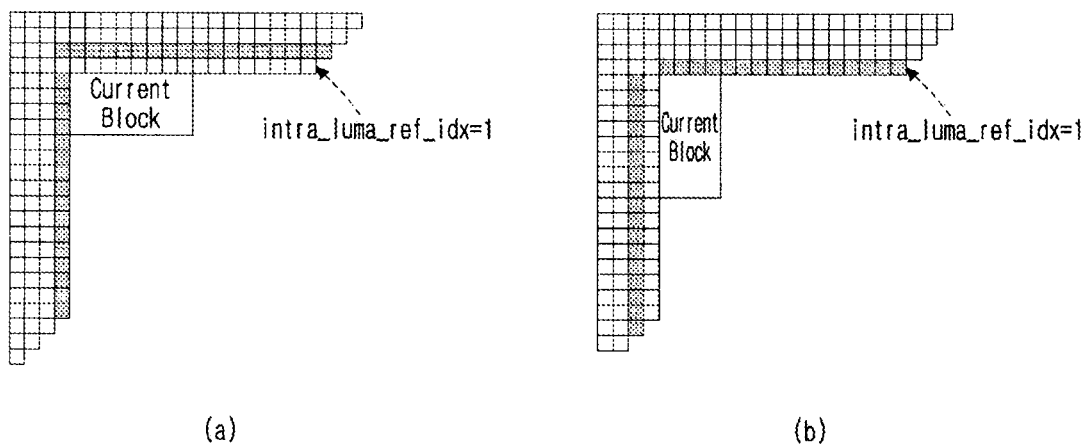
(a)     (b)

[FIG. 11]
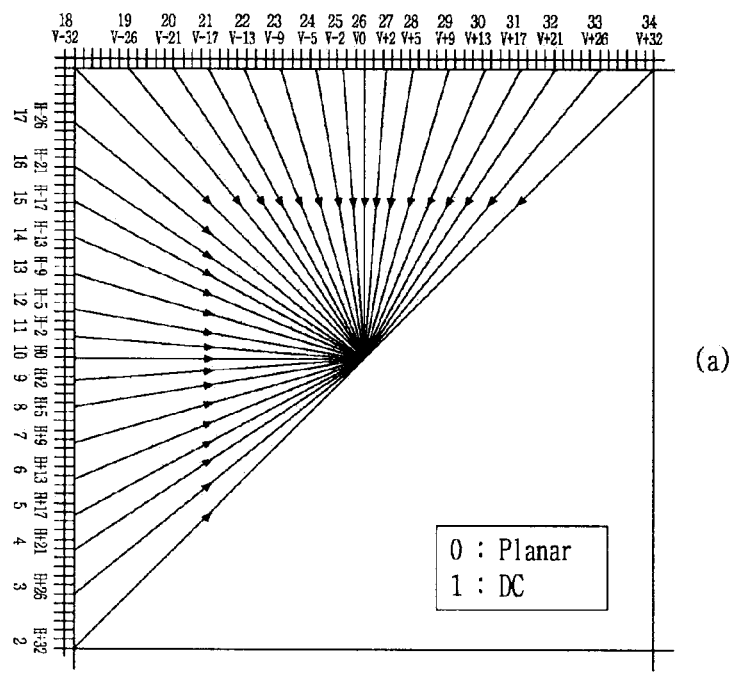
(a)
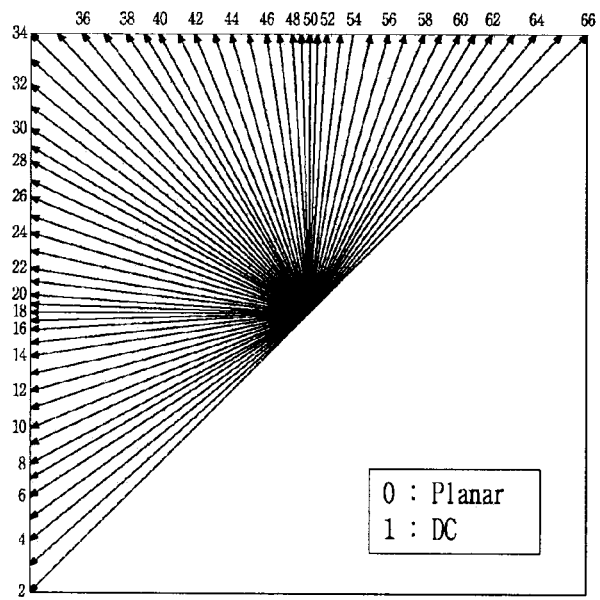
(b)

[FIG. 12]
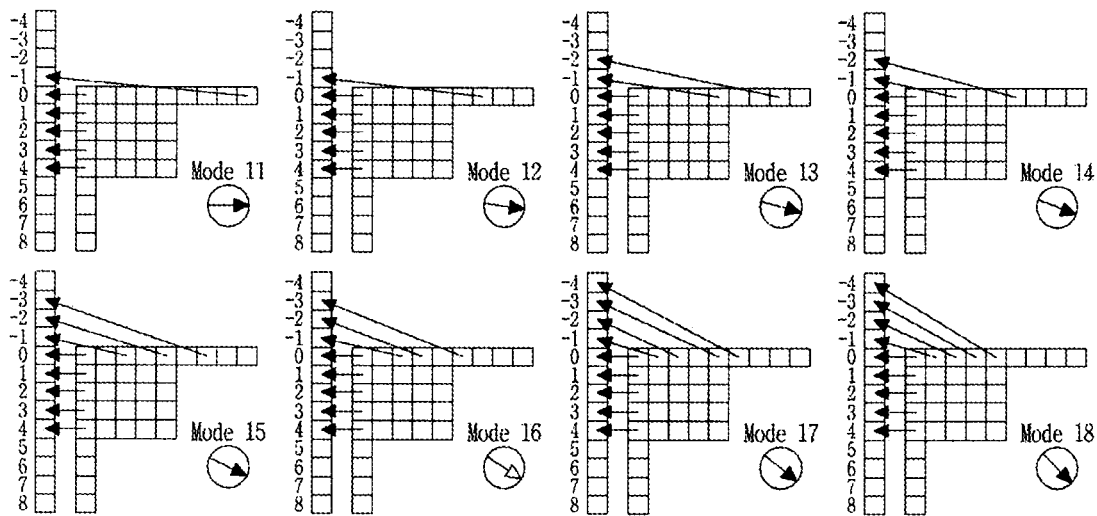
[FIG. 13]
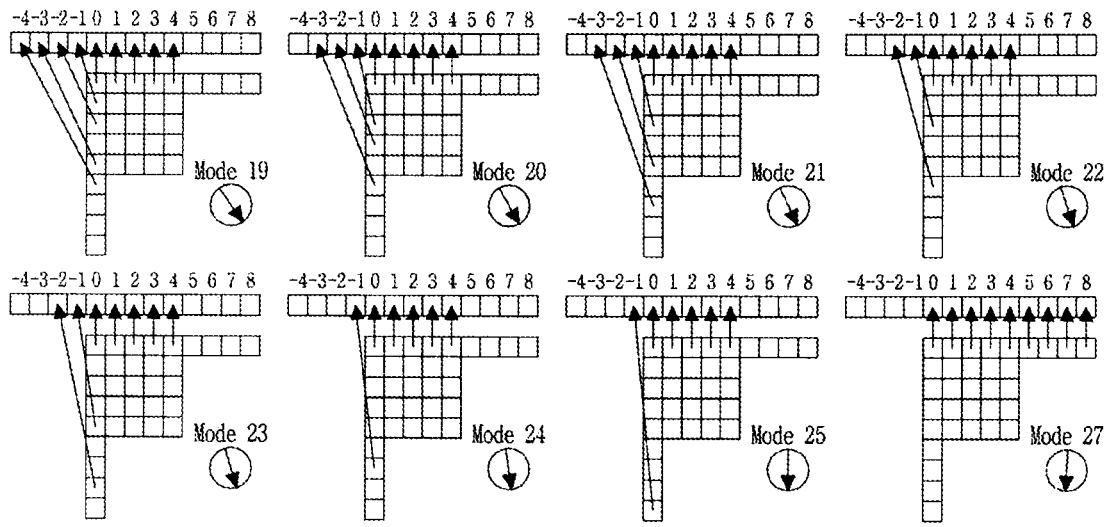

[FIG. 14]
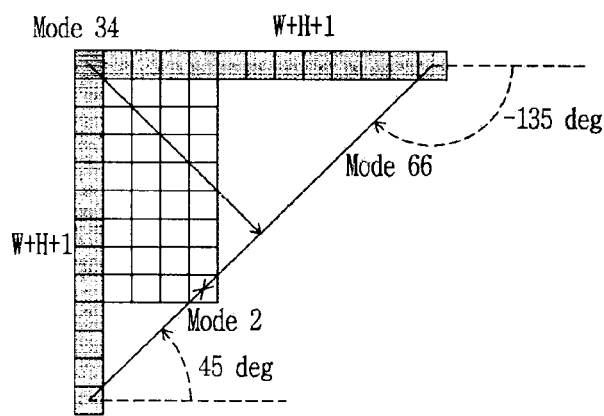
[FIG. 15]
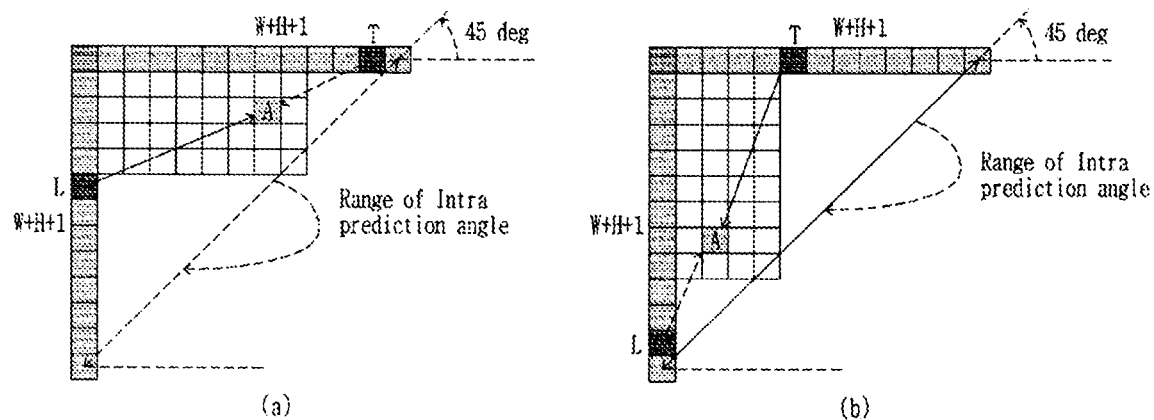
(a)  (b)

[FIG. 16]
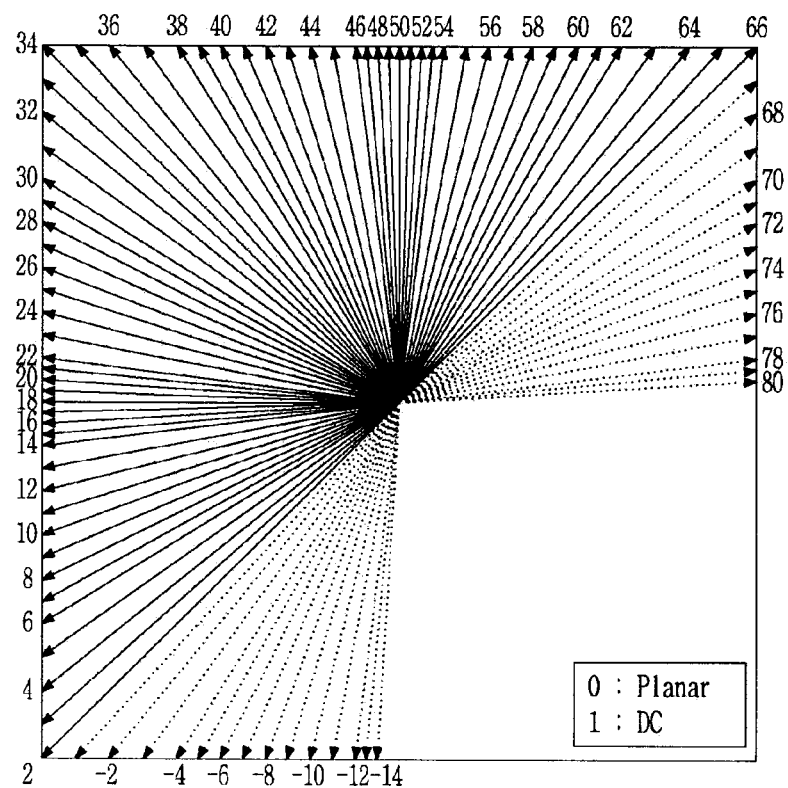

【FIG. 17】
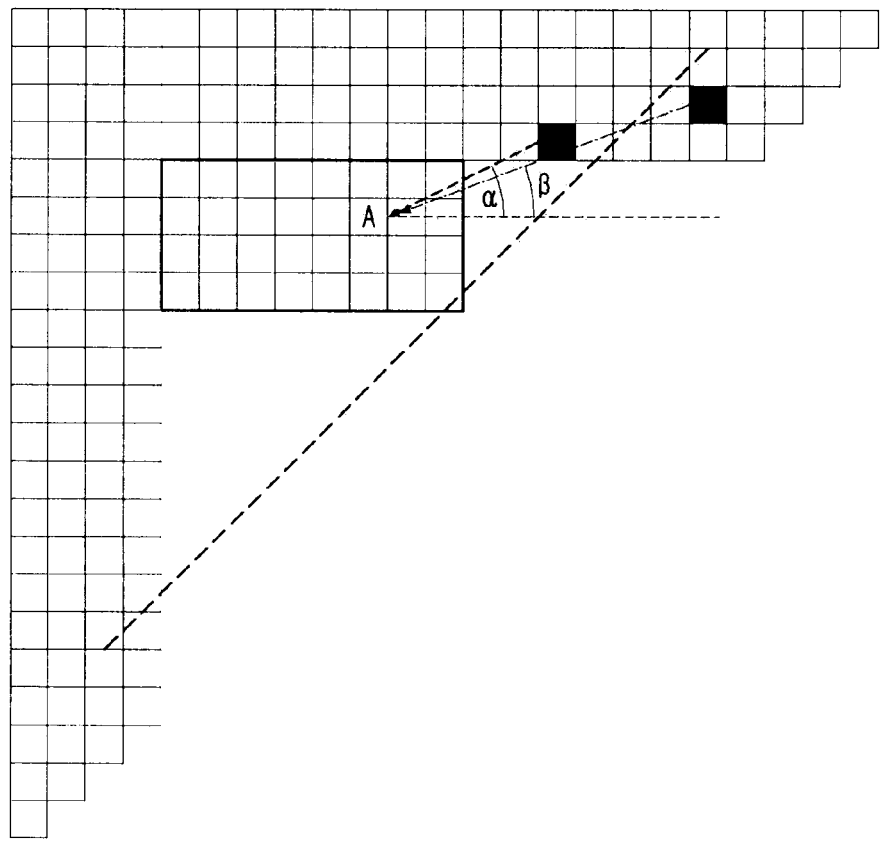
【FIG. 18】
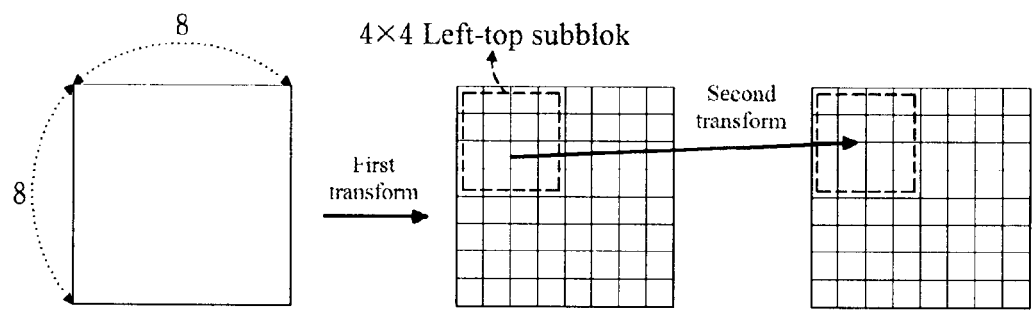

[FIG. 19]
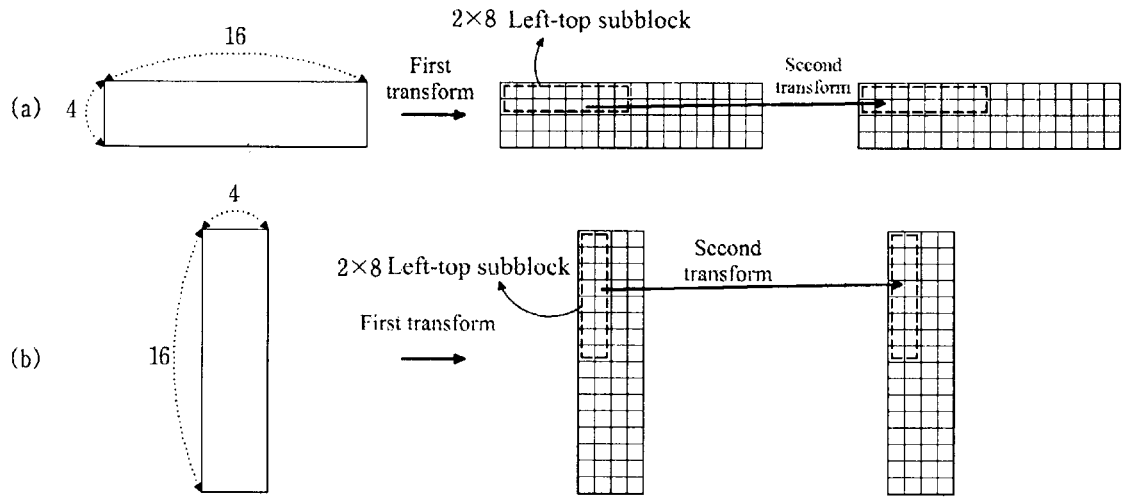
[FIG. 20]
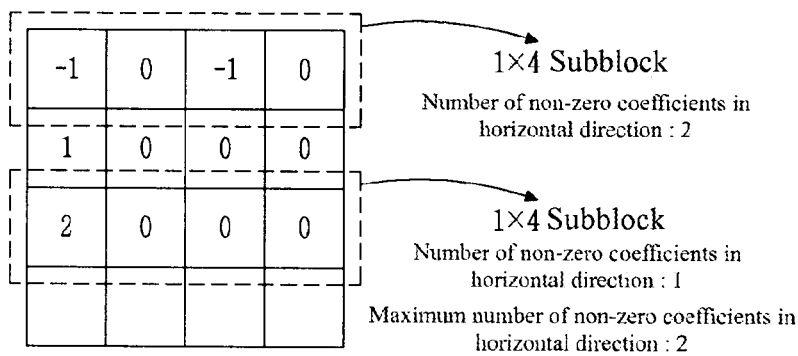
(a)
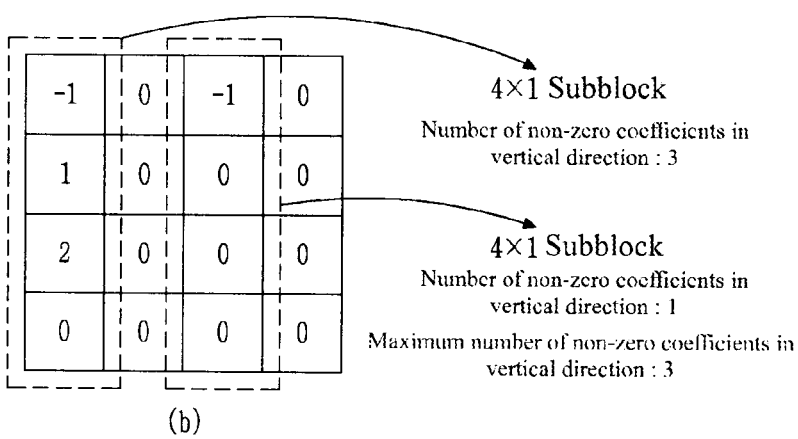
(b)

METHOD OF ENCODING/DECODING VIDEO SIGNAL USING INTRA PREDICTION AND APPARATUS THEREFOR

CROSS-REFERENCE TO RELATED APPLICATIONS

This application is a continuation application of U.S. Ser. No. 17/049,289, filed Oct. 20, 2020, which claims the benefit under 35 U.S.C. section 371, of PCT International Application No.: PCT/KR2019/016495, filed on Nov. 27, 2019, which claims foreign priority to Korean Patent Application No.: 10-2018-0148931, filed on Nov. 27, 2018, in the Korean Intellectual Property Office, both of which are hereby incorporated by reference in their entireties.

FIELD OF THE DISCLOSURE

The present disclosure relates to a video signal encoding/decoding method and a device therefor.

DESCRIPTION OF THE RELATED ART

As display panels become larger, video service of higher quality is required. The biggest problem with high-definition video service is that an amount of data is greatly increased. In order to solve the above problem, research for improving the video compression rate is being actively conducted. As a representative example, the Joint Collaborative Team on Video Coding (JCT-VC) was formed in 2009 by the Motion Picture Experts Group (MPEG) and the Video Coding Experts Group (VCEG) under the International Telecommunication Union-Telecommunication (ITU-T). The JCT-VC proposed High Efficiency Video Coding (HEVC), a video compression standard that has about twice compression performance of H.264/AVC, and that was approved as standard on Jan. 25, 2013. However, with rapid development of high-definition video services, the performance of HEVC is gradually showing its limitations.

DISCLOSURE

Technical Purpose

A purpose of the present disclosure is to provide an intra prediction method using a plurality of reference sample line candidates in encoding/decoding a video signal, and a device for performing the method.

A purpose of the present disclosure is to provide a method for deriving an intra prediction mode based on an index of a reference sample line for a current block in encoding/decoding a video signal, and a device for performing the method.

Technical purposes obtainable from the present disclosure are non-limited to the above-mentioned technical purposes, and other unmentioned technical purposes may be clearly understood from the following description by those having ordinary skill in the technical field to which the present disclosure pertains.

Technical Solution

A video decoding/encoding method according to the present disclosure includes determining a reference sample line for a current block; deriving an intra prediction mode for the current block; and performing intra prediction of the current block, based on the reference sample line and the intra prediction mode. In this connection, the intra prediction mode may be derived based on at least one of a default mode or a most probable mode (MPM) list, and whether it is allowed to set the default mode as the intra prediction mode may be determined based on an index of the reference sample line.

In the video decoding/encoding method according to the present disclosure, when the index of the reference sample line indicates an adjacent reference sample line, the intra prediction mode may be derived by parsing a flag indicating whether the intra prediction mode is identical with the default mode, and when the index of the reference sample line indicates a non-adjacent reference sample line, the intra prediction mode may be derived without parsing the flag indicating whether the intra prediction mode is identical with the default mode.

In the video decoding/encoding method according to the present disclosure, deriving the intra prediction mode may further include parsing an MPM flag, wherein when the MPM flag indicates that an MPM identical with the intra prediction mode is present in the MPM list, a number of intra prediction mode candidates which can be set as the intra prediction mode may vary based on the index of the reference sample line.

In the video decoding/encoding method according to the present disclosure, when a first intra prediction mode for a top neighboring block adjacent to a top of the current block and a second intra prediction mode for a left neighboring block adjacent to a left of the current block are different from each other, and each of the first intra prediction mode and the second intra prediction mode is a directional intra prediction mode, the MPM list may include an intra prediction mode candidate derived by adding or subtracting 2 to or from a maximum value of the first intra prediction mode and the second intra prediction mode.

In the video decoding/encoding method according to the present disclosure, the default mode may be a planar mode.

It is to be understood that the foregoing summarized features are exemplary aspects of the following detailed description of the present disclosure without limiting the scope of the present disclosure.

Technical Effect

According to the present disclosure, the intra prediction method using the plurality of reference sample line candidates may be provided to improve intra prediction efficiency.

According to the present disclosure, the adaptive intra prediction mode derivation method based on the index of the reference sample line for the current block may be provided to improve intra prediction efficiency.

Effects obtainable from the present disclosure may be non-limited by the above mentioned effect, and other unmentioned effects may be clearly understood from the following description by those having ordinary skill in the technical field to which the present disclosure pertains.

BRIEF DESCRIPTION OF THE DRAWINGS

FIG. 1 is view showing a block diagram of a video encoding device (encoder) according to an embodiment of the present disclosure;

FIG. 2 is view showing a block diagram of a video decoding device (decoder) according to an embodiment of the present disclosure;

FIG. 3 is a view showing a basic coding tree unit according to an embodiment of the present disclosure;

FIG. 4 is a view showing various partitioning types of a coding block.

FIG. 5 is a view of an example showing an aspect of partitioning a CTU.

FIG. 6 is a flow diagram of an intra prediction method according to an embodiment of the present disclosure.

FIG. 7 is a view showing candidate reference sample lines according to an embodiment of the present disclosure.

FIG. 8 is a diagram showing an application scheme of a modified multi-line intra encoding method.

FIG. 9 shows an application scheme of a modified multi-line intra encoding method based on a value of a syntax above_non_adj_flag.

FIG. 10 is a view showing an application scheme of a modified multi-line intra encoding method based on a shape of a current block.

FIG. 11 is a diagram showing intra prediction modes.

FIG. 12 and FIG. 13 are views showing an example of a one-dimensional array in which reference samples are arranged in a row.

FIG. 14 is a diagram illustrating an angle between directional intra prediction modes and a straight line parallel to an x-axis.

FIG. 15 is a diagram showing an aspect in which a prediction sample is obtained when a current block has a non-square shape.

FIG. 16 is a view showing wide angle intra prediction modes.

FIG. 17 shows an example in which a wide angle intra prediction mode has an angle varying based on a reference sample line for a current block.

FIG. 18 and FIG. 19 are views showing a sub-block which is to be subjected to a second transform.

FIG. 20 is a diagram for describing an example in which a transform type of a current block is determined.

DETAILED DESCRIPTION OF THE DISCLOSURE

Hereinafter, embodiments of the present disclosure will be described in detail with reference to the accompanying drawings.

Image encoding and decoding is performed on a basis of a block. In an example, for a coding block, a transform block, or a prediction block, encoding/decoding processes such as transform, quantization, prediction, in-loop filtering, reconstruction, etc. may be performed.

Hereinafter, an encoding/decoding target block is referred to as a "current block". In an example, a current block may represent a coding block, a transform block, or a prediction block according to a current process of encoding/decoding.

In addition, the term "unit" used in the present specification represents a basis unit for performing a specific encoding/decoding process, and a "block" may be understood to represent a sample array having a predetermined size. Unless otherwise stated, "block" and "unit" may be used interchangeably. In an example, in examples described later, a coding block and a coding unit may be understood to have the same meaning as each other.

FIG. 1 is view showing a block diagram of an image encoding apparatus (encoder) according to an embodiment of the present disclosure.

Referring to FIG. 1, an image encoding apparatus 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

Components described in FIG. 1 are independently illustrated in order to show different characteristic functions in an image encoding apparatus, and the figure does not mean that each component is constituted by separated hardware or one software unit. That is, each component is just enumerated for convenience of explanation, at least two components of respective components may constitute one component or one component may be divided into a plurality of components which may perform their functions. Even an embodiment of integrating respective components and embodiment of dividing a component are also included in the scope of the present disclosure unless they are departing from the spirit of the present disclosure.

Further, some components are not requisite components that perform essential functions of the present disclosure but are optional components for just improving performance. The present disclosure may be implemented with the requisite component for implementing the spirit of the present disclosure other than the component used to just improve the performance and a structure including only the requisite component other than the optional component used to just improve the performance is also included in the scope of the present disclosure.

The picture partitioning unit 110 may partition an input picture into at least one processing unit. In this connection, the processing unit may be a prediction unit (PU), a transform unit (TU), or a coding unit (CU). In the picture partitioning unit 110, a single picture may be partitioned into combinations of a plurality of coding units, prediction units, and transform units, and the picture may be encoded by selecting a combination of the coding units, the prediction units, and the transform units according to a predetermined condition (for example, cost function).

For example, a single picture may be partitioned into a plurality of coding units. In order to partition a picture into coding units, a recursive tree structure such as a quad-tree structure may be used, and a coding unit that is originated from a root such as a single image or largest coding unit may be partitioned into other coding units and may have child nodes as many as the partitioned coding units. A coding unit that is no longer partitioned according to certain restrictions becomes a leaf node. Namely, when it is assumed that only square partitioning is available for a single coding unit, a single coding unit may be partitioned into at most four other coding units.

Hereinafter, in the embodiment of the present disclosure, a coding unit may be used as a unit for encoding or may be used as a unit for decoding.

A prediction unit may be obtained by partitioning a single coding unit into at least one square or rectangle having the same size, or a single coding unit may be partitioned into prediction units in such a manner that one prediction unit may be different from another prediction unit in a shape and/or size.

In generation of a prediction unit based on a coding block to which intra-prediction is being performed, when the coding unit is not the smallest coding unit, intra-prediction may be performed without performing partitioning into a plurality of N×N prediction units.

The prediction units 120 and 125 may include an inter-prediction unit 120 performing inter-prediction and an intra prediction unit 125 performing intra-prediction. Whether to perform inter-prediction or intra-prediction on a prediction unit may be determined, and detailed information (for example, an intra-prediction mode, a motion vector, a reference picture, etc.) according to each prediction method may be determined. In this connection, a processing unit on which prediction is performed may differ with a processing unit for which a prediction method, and detail thereof are determined. For example, a prediction method, a prediction mode, etc. may be determined on the basis of a prediction unit, and prediction may be performed on the basis of a transform unit. A residual value (residual block) between the generated prediction block and an original block may be input to the transform unit 130. In addition, prediction mode information used for prediction, motion vector information, etc. may be encoded using a residual value by the entropy encoding unit 165 and may be transmitted to the decoder. When a specific encoding mode is used, an original block is encoded as it is and transmitted to a decoding unit without generating a prediction block through the prediction unit 120 or 125.

The inter-prediction unit 120 may predict a prediction unit on the basis of information on at least one of a previous picture and a subsequent picture of a current picture, or in some cases, may predict a prediction unit on the basis of information on some encoded regions in the current picture. The inter-prediction unit 120 may include a reference picture interpolation unit, a motion prediction unit, and a motion compensation unit.

The reference picture interpolation unit may receive reference picture information from the memory 155, and generate pixel information of a pixel at an integer or less from the reference picture. In case of a luma pixel, an 8-tap DCT-based interpolation filter having different coefficients may be used so as to generate pixel information on a pixel at an integer or less for a ¼ pixel unit. In case of a chroma signal, a 4-tap DCT-based interpolation filter having different filter coefficients may be used so as to generate pixel information on a pixel at an integer or less for a ⅛ pixel unit.

The motion prediction unit may perform motion prediction based on a reference picture interpolated by the reference picture interpolation unit. As methods for calculating a motion vector, various methods, such as a full search-based block matching algorithm (FBMA), a three step search (TSS) algorithm, a new three-step search (NTS) algorithm, etc. may be used. A motion vector may have a motion vector value in a unit of ½ or ¼ pixel on the basis of the interpolated pixel. The motion prediction unit may predict a current prediction unit by varying a motion prediction method. As motion prediction methods, various methods, such as a skip method, a merge method, an advanced motion vector prediction (AMVP) method, an intra block copy method, etc. may be used.

The intra-prediction unit 125 may generate a prediction unit on the basis of information on a reference pixel around a current block, which is pixel information in a current picture. When a neighboring block of a current prediction unit is a block for which inter-prediction is performed, and thus a reference pixel is a pixel for which inter-prediction is performed, a reference pixel included in the block for which inter-prediction is performed may be replaced by information on a reference pixel of a neighboring block for which intra-prediction is performed. In other words, when a reference pixel is unavailable, at least one reference pixel of available reference pixels may be used in place of unavailable reference pixel information.

A prediction mode in intra-prediction may include a directional prediction mode using reference pixel information according to a prediction direction and a non-directional mode not using directional information when performing prediction. A mode for predicting luma information may be different from a mode for predicting chroma information. In order to predict the chroma information, information on an intra-prediction mode used for predicting the luma information or information on a predicted luma signal may be used.

In performing intra-prediction, when a prediction unit is identical in a size with a transform unit, intra-prediction may be performed on the prediction unit on the basis of pixels positioned at the left, the top-left, and the top of the prediction unit. However, in performing intra-prediction, when a prediction unit is different in a size with a transform unit, intra-prediction may be performed by using a reference pixel based on the transform unit. In addition, intra-prediction using N×N partitioning may be only used for the smallest coding unit.

In an intra-prediction method, a prediction block may be generated after applying an adaptive intra smoothing (AIS) filter to a reference pixel according to a prediction mode. A type of AIS filter applied to a reference pixel may vary. In order to perform an intra-prediction method, an intra prediction mode for a current prediction unit may be predicted from an intra-prediction mode of a prediction unit present around the current prediction unit. In predicting a prediction mode for a current prediction unit by using mode information predicted from a neighboring prediction unit, when an intra prediction mode for the current prediction unit is identical to an intra prediction mode of the neighboring prediction unit, information indicating that the current prediction unit and the neighboring prediction unit have the same prediction mode may be transmitted by using predetermined flag information. When a prediction mode for the current prediction unit is different from prediction modes of the neighboring prediction units, entropy encoding may be performed to encode information on a prediction mode for a current block.

In addition, a residual block may be generated which includes information on a residual value that is a difference value between a prediction unit for which prediction is performed on by the prediction unit 120 or 125, and an original block of the prediction unit. The generated residual block may be input to the transform unit 130.

The transform unit 130 may perform transform on a residual block, which includes information on a residual value between an original block and a prediction unit generated by the prediction unit 120 or 125, by using a transform method such as discrete cosine transform (DCT) or discrete sine transform (DST). In this connection, a DCT transform core includes at least one of DCT2 or DCT8 and a DST transform core includes DST7. Whether to apply DCT, or DST so as to perform transform on a residual block may be determined on the basis of information on an intra-prediction mode of a prediction unit which is used to generate the residual block. It is possible to skip a transform for a residual block. A flag indicating whether or not to skip a transform for a residual block may be encoded. A transform skip may be allowed for a residual block whose a size is smaller than or equal to a threshold value, a residual block of a luma component, or a residual block of a chroma component under 4:4:4 format.

The quantization unit 135 may perform quantization on values transformed into a frequency domain by the transform unit 130. A quantization coefficient may vary according to a block or importance of an image. Values calculated in the quantization unit 135 may be provided to the dequantization unit 140 and the rearrangement unit 160.

The rearrangement unit 160 may perform rearrangement on coefficient values with respect to quantized residual values.

The rearrangement unit 160 may change coefficients in the form of a two-dimensional block into coefficients in the form of a one-dimensional vector through a coefficient scanning method. For example, the rearrangement unit 160 may scan from a DC coefficient to a coefficient in a high frequency domain by using a zigzag scanning method so as to change the coefficients into the form of a one-dimensional vector. According to a size and an intra prediction mode of a transform unit, rather than zigzag scanning, vertical directional scanning where coefficients in the form of a two-dimensional block are scanned in a column direction, or horizontal directional scanning where coefficients in the form of two-dimensional block are scanned in a row direction may be used. In other words, which scanning method among zigzag scanning, vertical directional scanning, and horizontal directional scanning is used may be determined according to a size and an intra prediction mode of a transform unit.

The entropy encoding unit 165 may perform entropy encoding on the basis of values calculated by the rearrangement unit 160. Entropy encoding may use various encoding methods, for example, exponential Golomb coding, context-adaptive variable length coding (CAVLC), or context-adaptive binary arithmetic coding (CABAL).

The entropy encoding unit 165 may encode various types of information, such as information on a residual value coefficient and information on a block type of a coding unit, information on a prediction mode, information on a partitioning unit, information on a prediction unit, information on a partitioning unit, information on a prediction unit and information on a transmission unit, information on a motion vector, information on a reference frame, information on a block interpolation, filtering information, etc. obtained from the rearrangement unit 160 and the prediction units 120 and 125.

The entropy encoding unit 165 may entropy encode coefficients of a coding unit input from the rearrangement unit 160.

The dequantization unit 140 may perform dequantization on values quantized in the quantization unit 135, and the inverse-transform unit 145 may perform inverse-transform on values transformed in the transform unit 130. A residual value generated by the dequantization unit 140 and the inverse-transform unit 145 may be added with a prediction unit predicted by a motion estimation unit, a motion compensation unit, or the intra-prediction unit which are included in the prediction units 120 and 125 so as to generate a reconstructed block.

The filter unit 150 may include at least one of a deblocking filter, an offset correction unit, and an adaptive loop filter (ALF).

The deblocking filter may remove block distortion that occurs due to boundaries between blocks in a reconstructed picture. In order to determine whether or not to perform deblocking, whether or not to apply a deblocking filter to a current block may be determined on the basis of pixels included in several rows and columns included in a block. When a deblocking filter is applied to a block, a strong filter or a weak filter is applied according to required deblocking filtering strength. In addition, in applying a deblocking filter, when performing horizontal directional filtering and vertical directional filtering, horizontal directional filtering and vertical directional filtering may be configured to be processed in parallel.

The offset correction unit may correct an original image by an offset in a unit of a pixel with respect to an image for which deblocking is performed. In order to perform offset correction on a specific picture, a method of applying a offset to a region which is determined after partitioning pixels of the image into the predetermined number of regions, or a method of applying an offset according to edge information of each pixel may be used.

Adaptive loop filtering (ALF) may be performed on the basis of a value obtained by comparing a filtered reconstructed image with an original image. Pixels included in an image may be partitioned into predetermined groups, a filter to be applied to each of the groups may be determined, and filtering may be individually performed on each group. Information on whether or not to apply ALF and may be transmitted for each coding unit (CU) for a luma signal, and a shape and a filter coefficient of an ALF filter to be applied may vary on the basis of each block. Alternatively, an ALF filter having the same shape (fixed shape) may be applied regardless of a feature of a block to which the filter will be applied.

In the memory 155, a reconstructed block or picture calculated through the filter unit 150 may be stored. The stored reconstructed block or picture may be provided to the prediction unit 120 or 125 when performing inter-prediction.

FIG. 2 is view showing a block diagram of an image decoding apparatus (decoder) according to an embodiment of the present disclosure.

Referring to FIG. 2, an image decoding apparatus 200 may include: an entropy decoding unit 210, a rearrangement unit 215, a dequantization unit 220, an inverse-transform unit 225, prediction units 230 and 235, a filter unit 240, and a memory 245.

When an image bitstream is input from the encoder, the input bitstream may be decoded according to an inverse process of the image encoding apparatus.

The entropy decoding unit 210 may perform entropy decoding according to the inverse process of the entropy encoding by the entropy encoding unit of the image encoder. For example, in association with the methods performed by the image encoder apparatus, various methods, such as exponential Golomb coding, context-adaptive variable length coding (CAVLC), or context-adaptive binary arithmetic coding (CABAC) may be applied.

The entropy decoding unit 210 may decode information on intra-prediction and inter-prediction performed by the encoder.

The rearrangement unit 215 may perform rearrangement on the bitstream entropy decoded by the entropy decoding unit 210 on the basis of the rearrangement method used in the encoder. Coefficients represented in the form of a one-dimensional vector may be reconstructed and rearranged into coefficients in the form of a two-dimensional block. The rearrangement unit 215 may perform rearrangement through a method of receiving information related to coefficient scanning performed in the encoder and of inversely scanning on the basis of the scanning order performed in the encoder.

The dequantization unit 220 may perform dequantization on the basis of a quantization parameter received from the encoder and coefficient values of the rearranged block.

The inverse-transform unit 225 may perform, an inverse transform, that is inverse DCT or inverse DST, against to a transform, that is DCT or DST, performed on the quantization result by the transform unit in the image encoder. In this connection, a DCT transform core may include at least one of DCT2 or DCT8, and a DST transform core may include DST7. Alternatively, when the transform is skipped in the image encoder, the inverse-transform also not be performed in the inverse-transform unit 225. Inverse transform may be performed on the basis of a transmission unit determined by the image encoder. The inverse transform unit 225 of the image decoder may selectively perform a transform method (for example, DCT, or DST) according to multiple pieces of information, such as a prediction method, a size of a current block, a prediction direction, etc.

The prediction unit 230 or 235 may generate a prediction block on the basis of information related to a prediction block received from the entropy decoding unit 210 and information on a previously decoded block or picture received from the memory 245.

As described above, as the operation of the image encoder, in performing intra-prediction, when a prediction unit is identical in size with a transform unit, intra-prediction may be performed on the prediction unit on the basis of pixels positioned at the left, the top-left, and the top of the prediction unit. However, in performing intra-prediction, when a prediction unit is different in size with a transform unit, intra-prediction may be performed by using a reference pixel based on the transform unit. In addition, intra-prediction using N×N partitioning may be only used for the smallest coding unit.

The prediction units 230 and 235 may include a PU determination module, an inter-prediction unit, and an intra-prediction unit. The PU determination unit may receive various types of information, such as information on a prediction unit, information on a prediction mode of an intra-prediction method, information on a motion prediction of an inter-prediction method, etc. which are input from the entropy decoding unit 210, divide a prediction unit in a current coding unit, and determine whether inter-prediction or intra-prediction is performed on the prediction unit. By using information required in inter-prediction of a current prediction unit received from the image encoder, the inter-prediction unit 230 may perform inter-prediction on the current prediction unit on the basis of information on at least one of a previous picture and a subsequent picture of a current picture including the current prediction unit. Alternatively, inter-prediction may be performed on the basis of information on some pre-reconstructed regions in a current picture including the current prediction unit.

In order to perform inter-prediction, which method among a skip mode, a merge mode, an AMVP mode, or an intra block copy mode is used as a motion prediction method for a prediction unit included in a coding unit may be determined on the basis of the coding unit.

The intra prediction unit 235 may generate a prediction block on the basis of information on a pixel within a current picture. When a prediction unit is a prediction unit for which intra-prediction has been performed, intra-prediction may be performed on the basis of information on an intra-prediction mode of a prediction unit received from the image encoder. The intra prediction unit 235 may include an adaptive intra smoothing (AIS) filter, a reference pixel interpolation module, or a DC filter. The AIS filter may perform filtering on a reference pixel of a current block, and whether to apply the filter may be determined according to a prediction mode for a current prediction unit. A prediction mode of the prediction unit and information on an AIS filter which are received from the image encoder may be used when performing AIS filtering on a reference pixel of a current block. When a prediction mode for the current block is a mode to which AIS filtering is not applied, the AIS filter may not be applied.

When a prediction mode of a prediction unit is a prediction mode for which intra-prediction is performed on the basis of a pixel value obtained by interpolating reference pixels, the reference pixel interpolation unit may interpolate the reference pixels so as to generate a reference pixel having a unit of an integer or less. When a prediction mode for a current prediction unit is a prediction mode where a prediction block is generated without interpolating reference pixels, the reference pixels may not be interpolated. The DC filter may generate a prediction block through filtering when a prediction mode for a current block is a DC mode.

A reconstructed block or picture may be provided to the filter unit 240. The filter unit 240 may include a deblocking filter, an offset correction module, and an ALF.

Information on whether or not a deblocking filter has been applied to a corresponding block or picture and information on whether a strong filter or a weak filter is applied when the deblocking filter is applied may be received from the image encoder. The deblocking filter of the image decoder may receive information on a deblocking filter from the image encoder, and the image decoder may perform deblocking filtering on a corresponding block.

The offset correction unit may perform offset correction on a reconstructed image on the basis of a type of offset correction, information on an offset value, etc. applied to an image when performing encoding.

The ALF may be applied to a coding unit on the basis of information on whether or not to apply ALF, information on an ALF coefficient, etc. received from the encoder. The above ALF information may be provided by being included in a particular parameter set.

In the memory 245, a reconstructed picture or block may be stored so as to be used as a reference picture or reference block, and the reconstructed picture may be provided to an output unit.

FIG. 3 is a view showing a basic coding tree unit according to an embodiment of the present disclosure.

The largest coding block may be defined as a coding tree block. A single picture may be partitioned into a plurality of coding tree units (CTU). A CTU may be a coding unit of the largest size, and may be referred to as the largest coding unit (LCU). FIG. 3 is a view showing an example where a single picture is partitioned into a plurality of CTUs.

A size of a CTU may be defined in a picture level or sequence level. For the same, information representing a size of a CTU may be signaled through a picture parameter set or sequence parameter set.

In an example, a size of a CTU for the entire picture within a sequence may be set to 128×128. Alternatively, any one of 128×128 or 256×256 may be determined as a size of a CTU in a picture level. In an example, a CTU may be set to have a size of 128×128 in a first picture, and a size of 256×256 in a second picture.

Coding blocks may be generated by partitioning a CTU. A coding block represents a basic unit for performing encoding/decoding. In an example, prediction or transform may be performed for each coding block, or a prediction encoding mode may be determined for each coding block. In this connection, the prediction encoding mode represents a method of generating a prediction image. In an example, a prediction encoding mode may include intra-prediction, inter-prediction, current picture referencing (CPR), intra block copy (IBC) or combined prediction. For a coding block, a prediction block of the coding block may be generated by using a prediction encoding mode of at least one of intra-prediction, inter-prediction, current picture referencing, or combined prediction.

Information representing a prediction encoding mode for a current block may be signaled in a bitstream. In an example, the information may be a 1-bit flag representing whether a prediction encoding mode is an intra mode or an inter mode. When a prediction encoding mode for a current block is determined as an inter mode, current picture referencing or combined prediction may be available.

Current picture referencing is setting a current picture as a reference picture and obtaining a prediction block of a current block from a region that has been already encoded/decoded within a current picture. In this connection, the current picture means a picture including the current block. Information representing whether or not current picture referencing is applied to a current block may be signaled in a bitstream. In an example, the information may be a 1-bit flag. When the flag is TRUE, a prediction encoding mode for a current block may be determined as current picture referencing, and when the flag is FALSE, a prediction encoding mode for a current block may be determined as inter-prediction.

Alternatively, a prediction encoding mode for a current block may be determined on the basis of a reference picture index. In an example, when a reference picture index indicates a current picture, a prediction encoding mode for a current block may be determined as current picture referencing. When a reference picture index indicates a picture other than a current picture, a prediction encoding mode for a current block may be determined as inter-prediction. In other words, current picture referencing is a prediction method using information on a region that has been already encoded/decoded within a current picture, and inter-prediction is a prediction method using information on another picture that has been already encoded/decoded.

Combined prediction represents a combined encoding mode combining at least two of intra-prediction, inter-prediction, and current picture referencing. In an example, when combined prediction is applied, a first prediction block may be generated on the basis of any one of intra-prediction, inter-prediction or current picture referencing, and a second prediction block may be generated on the basis of another. When a first prediction block and a second prediction block are generated, a final prediction block may be generated by calculating an average or weighted sum of the first prediction block and the second prediction block. Information representing whether or not to apply combined prediction to a current block may be signaled in a bitstream. The information may be a 1-bit flag.

FIG. 4 is a view showing various partitioning types a coding block.

A coding block may be partitioned into a plurality of coding blocks on the basis of quad-tree partitioning, binary-tree partitioning or ternary tree partitioning. The partitioned coding block may be partitioned again into a plurality of coding blocks on the basis of quad-tree partitioning, binary-tree partitioning or ternary tree partitioning.

Quad-tree partitioning represents a method of partitioning a current block into four blocks. As a result of quad-tree partitioning, a current block may be partitioned into four square partitions (refer to "SPLIT_QT" of FIG. 4 (a)).

Binary-tree partitioning represents a method of partitioning a current block into two blocks. Partitioning a current block into two blocks along a vertical direction (that is, using a vertical line across the current block) may be referred to vertical directional binary-tree partitioning, and partitioning a current block into two blocks along a horizontal direction (that is, using a horizontal line across the current block) may be referred to as horizontal directional binary-tree partitioning. As a result of binary-tree partitioning, a current block may be partitioned into two non-square partitions. "SPLIT_BT_VER" of FIG. 4 (b) is a view showing a result of vertical directional binary-tree partitioning, and "SPLIT_BT_HOR" of FIG. 4 (c) is a view showing a result of horizontal directional binary-tree partitioning.

Ternary-tree partitioning represents a method of partitioning a current block into three blocks. Partitioning a current block into three blocks along a vertical direction (that is, using two vertical lines across the current block) may be referred to vertical directional ternary-tree partitioning, and partitioning a current block into three blocks along a horizontal direction (that is, using two horizontal lines across the current block) may be referred to as horizontal directional ternary-tree partitioning. As a result of ternary-tree partitioning, a current block may be partitioned into three non-square partitions. In this connection, a width/height of a partition positioned at the center of a current block may be twice than a width/height of other partitions. "SPLIT_TT_VER" of FIG. 4 (d) is a view showing a result of vertical directional ternary-tree partitioning, and "SPLIT_TT_HOR" of FIG. 4 (e) is a view showing a result of horizontal directional ternary-tree partitioning.

The number of partitioning times of a CTU may be defined as a partitioning depth. The maximum partitioning depth of a CTU may be determined in a sequence or picture level. Accordingly, the maximum partitioning depth of a CTU may vary on the basis of a sequence or picture.

Alternatively, the maximum partitioning depth may be independently determined for each partitioning method. In an example, the maximum partitioning depth where quad-tree partitioning is allowed may differ from the maximum partitioning depth where binary-tree partitioning and/or ternary-tree partitioning is allowed.

The encoder may signal information representing at least one of a partitioning type and a partitioning depth of a current block in a bitstream. The decoder may determine a partitioning type and a partitioning depth of a CTU on the basis of the information obtained by parsing a bitstream.

FIG. 5 is a view of an example showing an aspect of partitioning a CTU.

Partitioning a coding block by using quad-tree partitioning, binary-tree partitioning and/or ternary-tree partitioning may be referred to as multi-tree partitioning.

Coding blocks generated by partitioning a coding block by applying multi-tree partitioning may be referred to child coding blocks. When a partitioning depth of a coding block is k, a partitioning depth of child coding blocks is set to k+1.

To the contrary, for coding blocks having a partitioning depth of k+1, a coding block having a partitioning depth of k may be referred to as a parent coding block.

A partitioning type of a current coding block may be determined on the basis of at least one of a partitioning type of a parent coding block and a partitioning type of a neighboring coding block. In this connection, the neighboring coding block may be a block adjacent to a current coding block, and include at least one of an top neighboring block, a left neighboring block, or a neighboring block adjacent to the top-left corner of the current coding block. In this connection, the partitioning type may include whether or not to apply quad-tree partitioning, whether or not to apply binary-tree partitioning, a direction of binary-tree partitioning, whether or not to apply ternary-tree partitioning, or a direction of ternary-tree partitioning.

In order to determine a partitioning type of a coding block, information representing whether or not a coding block is partitioned may be signaled in a bitstream. The information is a 1-bit flag of "split_cu_flag", and when the flag is TRUE, it may represent that a coding block is partitioned by a multi tree partitioning method.

When split_cu_flag is TRUE, information representing whether or not a coding block is partitioned by quad-tree partitioning may be signaled in a bitstream. The information is a 1-bit flag of split_qt_flag, and when the flag is TRUE, a coding block may be partitioned into four blocks.

In an example, in an example shown in FIG. 5, a CTU is partitioned by quad-tree partitioning, and thus four coding blocks having a partitioning depth of 1 are generated. In addition, it is shown that quad-tree partitioning is applied again to the first coding block and the fourth coding block among four coding blocks generated by quad-tree partitioning. As a result, four coding blocks having a partitioning depth of 2 may be generated.

In addition, by applying again quad-tree partitioning to a coding block having a partitioning depth of 2, a coding block having a partitioning depth of 3 may be generated.

When quad-tree partitioning is not applied to a coding block, whether to perform binary-tree partitioning or ternary-tree partitioning for the coding block may be determined according to at least one of a size of the coding block, whether or not the coding block is positioned at a picture boundary, the maximum partitioning depth, or a partitioning type of a neighboring block. When it is determined to perform binary-tree partitioning or ternary-tree partitioning for the coding block, information representing a partitioning direction may be signaled in a bitstream. The information may be a 1-bit flag of mtt_split_cu_vertical_flag. Whether a partitioning direction is a vertical direction or a horizontal direction may be determined on the basis of the flag. Additionally, information representing which one of binary-tree partitioning or ternary-tree partitioning is applied to the coding block may be signaled in a bitstream. The information may be a 1-bit flag of mtt_split_cu_binary_flag. Whether binary-tree partitioning is applied to the coding block or ternary-tree partitioning is applied to the coding block may be determined on the basis of the flag.

In an example, in an example shown in FIG. 5, vertical directional binary-tree partitioning is applied to a coding block having a partitioning depth of 1, vertical directional ternary-tree partitioning is applied to a left coding block among coding blocks generated by the partitioning, and vertical directional binary-tree partitioning is applied to a right coding block.

Inter-prediction is a prediction encoding mode predicting a current block by using information on a previous picture. In an example, a block (hereinafter, collocated block) at the same position with a current block within a previous picture may be set as a prediction block of the current block. Hereinafter, a prediction block generated on the basis of a collocated block of the current block may be referred to as a collocated prediction block.

To the contrary, when an object present in a previous picture has moved to another position in a current picture, a current block may be effectively predicted by using motions of the object. For example, when a movement direction and a size of the object is determined by comparing a previous picture with a current picture, a prediction block (or prediction image) of the current block may be generated according to motion information of the objects. Hereinafter, a prediction block generated by using motion information may be referred to as a motion prediction block.

A residual block may be generated by subtracting a prediction block from a current block. In this connection, in case where an object moves, energy of a residual block may be reduced by using a motion prediction block rather than using a collocated prediction block, and thus compression performance of the residual block may be improved.

As above, generating a prediction block by using motion information may be referred to as motion estimation prediction. In the most inter-prediction, a prediction block may be generated on the basis of motion compensation prediction.

Motion information may include at least one of a motion vector, a reference picture index, a prediction direction, and a bidirectional weighting factor index. A motion vector represents a movement direction of an object and a magnitude. A reference picture index specifies a reference picture of a current block among reference pictures included in a reference picture list. A prediction direction indicates any one of uni-directional L0 prediction, uni-directional L1 prediction, or bi-directional prediction (L0 prediction and L1 prediction). At least one of L0 directional motion information and L1 directional motion information may be used according to a prediction direction of a current block. A bidirectional weighting factor index specifies a weighting factor applied to an L0 prediction block and a weighting factor applied to an L1 prediction block.

Inter-prediction includes determining an inter-prediction mode for a current block, obtaining motion information of the current block according to the determined inter-prediction mode, and performing motion compensation prediction on the current block on the basis of the obtained motion information.

In this connection, the inter-prediction mode may represent various methods for determining motion information of a current block, and include an inter-prediction mode using translation motion information, an inter-prediction mode using affine motion information. In an example, an inter-prediction mode using translation motion information may include a merge mode and a motion vector prediction mode, and an inter-prediction mode using affine motion information may include an affine merge mode and an affine motion vector prediction mode. Motion information on a current block may be determined on the basis of a neighboring block neighboring the current block or information obtained by parsing a bitstream.

Motion information of a current block may be derived from motion information of another block. In this connection, another block may be a block encoded/decoded by inter prediction previous to the current block. Setting motion information of a current block to be the same as motion information of another block may be defined as a merge mode. Also, setting a motion vector of another block as a prediction value of a motion vector of the current block may be defined as a motion vector prediction mode.

A motion vector represents a difference between a position of an object in a previous picture and a position of the object in a current picture. Information for determining a precision of the motion vector may be signaled in a bitstream. The information may be determined in a unit of a sequence, slice, or block. The motion vector precision may be set to octo-pel, quarter-pel, half-pel, integer-pel, or 4-integer-pel.

Intra-prediction is a method for performing prediction on a current block by using a reconstructed sample that has been already encoded/decoded and which is around the current block. In this connection, a reconstructed sample before applying an in-loop filter may be used for intra-prediction of the current block.

An intra-prediction method includes intra-prediction based on a matrix and intra-prediction according to a direction with a neighboring reconstruction sample. Information indicating an intra-prediction method of a current block may be signaled in a bitstream. The information may be a 1-bit flag. Alternatively, an intra-prediction of a current block may be determined on the basis of at least one of a position of the current block, a size of the current block, a shape of the current block, or an intra-prediction method of a neighboring block. In an example, when a current block is present crossing a picture boundary, it may be set such that an intra-prediction method based on a matrix is not applied to the current block.

An intra-prediction method based on a matrix is a method of obtaining a prediction block of a current block on the basis of a matrix product of a matrix stored in the encoder and the decoder, and reconstruction samples around the current block. Information for specifying any one of a plurality of prestored matrices may be signaled in a bitstream. The decoder may determine a matrix for performing intra-prediction on a current block on the basis of the above information and a size of the current block.

General intra-prediction is a method of obtaining a prediction block of a current block on the basis of a non-directional intra-prediction mode or directional intra-prediction mode. Hereinafter, with reference to the figure, a process of intra-prediction based on general intra-prediction will be described.

FIG. 6 is a view of a flowchart showing an intra-prediction method according to an embodiment of the present disclosure.

A reference sample line of a current block may be determined S2201. The reference sample line means a group of reference samples included in a k-th spaced apart line from the top and/or the left of the current block. The reference sample may be derived from a reconstructed sample around the current block which has been already encoded/decoded.

Index information identifying a reference sample line for the current block among the plurality of reference sample lines may be signaled in a bitstream. In an example, index information, intra_luma_ref_idx, for specifying the reference sample line for the current block may be signaled in a bitstream. The index information may be signaled on a coding block basis.

A plurality of reference sample lines may include at least one of a first line, a second line, a third line, or a fourth line from a top and/or a left of the current block. A reference sample line consisted of a row adjacent to a top of the current block and a column adjacent to a left of the current block among the plurality of reference sample lines may be referred to as an adjacent reference sample line, and remaining reference sample lines may be referred to as non-adjacent reference sample lines.

FIG. 7 is a view showing candidate reference sample lines according to an embodiment of the present disclosure.

Only some of the plurality of reference sample lines may be selected as a reference sample line for the current block. In one example, remaining reference sample lines other than a third non-adjacent reference sample line among the plurality of reference sample lines may be set as the candidate reference sample lines. Table 1 shows an index assigned to each of the candidate reference sample lines.

TABLE 1

| Index (intra_luma_ref_idx) | Reference sample line |
| --- | --- |
| 0 | Adjacent reference sample line |
| 1 | First non-adjacent reference sample line |
| 2 | Second non-adjacent reference sample line |

A larger or smaller number of the candidate reference sample lines than the number of the candidate reference sample lines as described above may be set. Further, the number or position of the non-adjacent reference sample lines set as the candidate reference sample lines may not be limited to the above described examples. In one example, a first non-adjacent reference sample line and a third non-adjacent reference sample line may be set as the candidate reference sample lines, or a second non-adjacent reference sample line and the third non-adjacent reference sample line may be set as the candidate reference sample lines. Alternatively, all of the first non-adjacent reference sample line, the second non-adjacent reference sample line and the third non-adjacent reference sample line may be set as the candidate reference sample lines.

The number or a type of the candidate reference sample lines may be determined based on at least one of a size, a shape, and a position of the current block, whether the current block is divided into sub-blocks, or an intra prediction mode for the current block. In one example, when the size, or the shape of the current block or the intra prediction mode for the current block satisfies at least one predefined condition, the adjacent reference sample line, the first non-adjacent reference sample line and the second non-adjacent reference sample line are set as the candidate reference sample lines. To the contrary, at least one of the size, the shape or the intra prediction mode for the current block does not satisfy the predefined condition, the adjacent reference sample line, the first non-adjacent reference sample line and the third non-adjacent reference sample line may be set as the candidate reference sample lines. In this connection, the predefined condition may include whether the size of the current block is above or equal to a threshold, whether the size of the current block is below the threshold, or whether the intra prediction mode for the current block has a specific direction (e.g., a diagonal direction, a vertical direction, or a horizontal direction). In one example, when the intra prediction mode for the current block has the diagonal direction, the adjacent reference sample line, the first non-adjacent reference sample line, and the third non-adjacent reference sample line may be set as the candidate sample lines. To the contrary, when the intra prediction mode for the current block has the vertical or the horizontal direction, the adjacent reference sample line, the first non-adjacent reference sample line, and the second non-adjacent reference sample line may be set as the candidate sample lines.

Accordingly, a candidate reference sample line specified by index intra_luma_ref_idx may be variably determined based on at least one of the size, or the shape of the current block or the intra prediction mode for the current block. In an example, when at least one of the size, or the shape of the current block or the intra prediction mode for the current block satisfies a predefined condition, the index 2 may indicate the second non-adjacent reference sample line, whereas at least one of the size, or the shape of the current block or the intra prediction mode for the current block does not satisfy the predefined condition, the index 2 may indicate the third non-adjacent reference sample line.

Based on the at least one of the position, the size, the shape of the current block or a prediction encoding mode of a neighboring block thereto, the reference sample line for the current block may be determined. In one example, when the current block adjoins a boundary of a picture, a tile, a slice or a coding tree unit, the adjacent reference sample line may be determined as the reference sample line for the current block.

Alternatively, when the current block has a non-square shape, the adjacent reference sample line may be determined as the reference sample line for the current block. Alternatively, when a ratio between a width and a height of the current block is above or below the threshold, the adjacent reference sample line may be determined as the reference sample line for the current block.

The reference sample line may include top reference samples located at the top of the current block and left reference samples located at the left of the current block. Top reference samples and left reference samples may be derived from reconstructed samples around the current block. The reconstructed samples may be in a state before the in-loop filter is applied.

The number of reference samples included in the reference sample line may be determined based on a distance between the reference sample line and the current block. In one example, the number of reference samples included in a reference sample line spaced from the current block by i may be greater than the number of reference samples included in a reference sample line spaced from the current block by i-1. Accordingly, the number of reference samples included in the non-adjacent reference sample line may have a larger value than the number of reference samples included in the adjacent reference sample line.

A difference between the number of reference samples included in the non-adjacent reference sample line which is spaced from the current block by i and the number of reference samples included in the adjacent reference sample line may be defined as an offset of the number of reference samples. In this connection, a difference between the number of reference samples included in the top non-adjacent reference sample line and the number of reference samples included in the top adjacent reference sample line may be defined as offsetX[i]. Further, a difference between the number of reference samples included in the left non-adjacent reference sample line and the number of reference samples included in the left adjacent reference sample line may be defined as offsetY[i]. Each of offsetX and offsetY may be determined based on a distance between the current block and each of the top and left non-adjacent reference sample lines. In one example, each of offsetX and offsetY may be set to an integer multiple of i. In one example, each of offsetX[i] and offset[i] may be 2i.

Alternatively, the offset of the number of the reference samples may be determined based on the ratio between the width and the height of the current block. Equation 1 shows an example of expressing the ratio between the width and the height of the current block.

$$whRatio = Log_2(nTbW/nTbH) \quad \text{[Equation 1]}$$

The ratio between the width and the height of the current block may be expressed in a manner different that expressed in the Equation 1.

Values of offsetX and offsetY may be determined based on the ratio between the width and the height of the current block. For example, when a value of whRatio is greater than 1, the value of offsetX may be set to be larger than the value of offsetY. In one example, the value of offsetX may be set to 1, while the value of offsetY may be set to 0. To the contrary, when the value of whRatio is smaller than 1, the value of offsetY may be set larger than the value of offsetX. In one example, the value of offsetX may be set to 0, while the value of offsetY may be set to 1.

A non-adjacent reference sample line spaced from the current block by i may be composed of (refW+offsetX[i]) top reference samples and (refH+offsetY[i]) left reference samples, except for a left-top reference sample having the same x-axis and y-axis coordinates. In this connection, refW and refH indicate lengths of top and left adjacent reference sample lines, and may be set based on Equation 2 and 3, respectively.

$$refW = 2*nTbW \quad \text{[Equation 2]}$$

$$refH = 2*nTbH \quad \text{[Equation 3]}$$

In Equation 2 and Equation 3, nTbW represents a width of a coding block or a transform block subjected to intra prediction is performed, and nTbH represents a height of a coding block or transform block subjected to intra prediction.

As a result, a reference sample line spaced from the current block by i may be composed of (refW+refH+offsetX[i]+offsetY[i]+1) reference samples.

A prediction sample may be obtained using at least one of reference samples belonging to the reference sample line based on the intra prediction mode for the current block.

An intra prediction encoding method for selecting one of a plurality of candidate reference sample lines may be defined as a multi-line intra prediction encoding method. When a top boundary of the current block adjoins a top boundary of the coding tree unit, the multi-line intra prediction encoding method may be configured not to be used. When the multi-line intra prediction encoding method is not used, signaling of index intra_luma_ref_idx may be omitted, and the adjacent reference sample line may be set as the reference sample line for the current block. That is, when the top boundary of the current block adjoins the top boundary of the coding tree unit, it may be determined that the non-adjacent reference sample line is not available. In this connection, when the top boundary of the current block adjoins the top boundary of the coding tree unit, a top neighboring block located adjacent to the top of the current block and the current block are not included in the same coding tree unit. Similarly, when a left boundary of the current block adjoins a left boundary of the coding tree unit, a left neighboring block located adjacent to the left of the current block and the current block are not included in the same coding tree unit.

In another example, when the boundary of the current block adjoins the boundary of the coding tree unit, a modified multi-line intra encoding method that combines a plurality of reference sample lines may be used. In the modified multi-line intra encoding method, the top reference samples for the current block are derived from the first reference sample line, and the left reference samples for the current block is derived from the second reference sample line different from the first reference sample line. In this connection, one of the first reference sample line and the second reference sample line may be the adjacent reference sample line, while the other thereof may be the non-adjacent reference sample line.

FIG. 8 is a diagram showing an embodiment of a modified multi-line intra encoding method.

The non-adjacent reference sample line is determined as the reference sample line for the current block. However, when the top boundary of the current block adjoins the top boundary of the coding tree unit, the top reference samples for the current block may be derived from the adjacent reference sample line, and the left reference samples for the current block may be derived from the non-adjacent reference sample line. That is, the adjacent reference sample line may be used on the top of the current block, while the non-adjacent reference sample line may be used on the left of the current block.

(a) in FIG. 8 shows an application aspect of the modified multi-line intra encoding method when the first non-adjacent reference sample line is determined as the reference sample line for the current block (that is, when a value of intra_luma_ref_idx is 1). (b) in FIG. 8 shows an application aspect of the modified multi-line intra encoding method when the third non-adjacent reference sample line is determined as the reference sample line for the current block (i.e., when the value of intra_luma_ref_idx is 2).

As in the example shown in (a) of FIG. 8, when the first non-adjacent reference sample line is determined as the reference sample line for the current block, the left reference samples for the current block may be derived based on the first non-adjacent reference sample line, while the top reference samples for the current block may be derived based on the adjacent reference sample line.

As in the example shown in (b) of FIG. 8, when the third non-adjacent reference sample line is determined as the reference sample line for the current block, the left reference samples for the current block may be derived based on the third non-adjacent reference sample line, while the top reference samples for the current block may be derived based on the adjacent reference sample line.

As in the above example, whether the modified multi-line intra encoding method is applied or not may be determined based on at least one of whether the top boundary of the current block adjoins the top boundary of the coding tree unit or whether the index specifying the reference sample line for the current block has a value greater than the threshold.

In another example, whether the modified multi-line intra encoding method is applied or not may be determined regardless of whether the boundary of the current block adjoins the boundary of the coding tree unit. In one example, whether the modified multi-line intra encoding method is applied or not may be determined based on at least one of the size, or the shape of the current block or the intra prediction mode for the current block.

Alternatively, information indicating whether the modified multi-line intra encoding method is applied or not may be signaled in a bitstream. The information may be a 1-bit flag, and may be signaled on a sequence, picture, slice, tile, or block basis.

When the modified multi-line encoding method is applied to the current block, an index used for determining the reference sample line may specify a non-adjacent reference sample line used to derive the left reference samples or the top reference samples. In one example, the index intra_luma_ref_idx may be used to determine a non-adjacent reference sample line used to derive the left reference samples or the top reference samples. In this connection, the index information may refer to one of the non-adjacent reference sample lines except the adjacent reference sample line. Accordingly, the non-adjacent reference sample line may be determined based on a value obtained by adding 1 to the value of the index intra_luma_ref_idx.

When the modified multi-line encoding method is applied to the current block, information indicating which of the top reference samples or the left reference samples are derived based on the adjacent reference sample line may be signaled in a bitstream. In one example, syntax above_non_adj_flag indicating whether the top reference samples are derived based on the adjacent reference sample line may be signaled in a bitstream.

FIG. 9 shows an embodiment of a modified multi-line intra encoding method based on a value of the syntax above_non_adj_flag.

As in the example shown in (a) of FIG. 9, when the value of above_non_adj_flag is 0, the left reference samples may be derived based on the adjacent reference sample line, and the top reference samples may be derived based on the non-adjacent reference sample line.

As in the example shown in (b) of FIG. 9, when the value of above_non_adj_flag is 1, the top reference samples may be derived based on the adjacent reference sample line, and the left reference samples may be derived based on the non-adjacent reference sample line.

Alternatively, which of the top reference samples or left reference samples is derived based on the adjacent reference sample line may be determined based on at least one of the shape, the size, or the intra prediction mode for the current block. In one example, when the current block has a non-square shape, the reference samples located at one having a smaller length of a horizontal side (width) and a vertical side (height) of the current block may be derived based on the adjacent reference sample line, and the reference samples located at the other thereof may be derived based on the non-adjacent reference sample line.

FIG. 10 is a view showing an embodiment of a modified multi-line intra encoding method based on a shape of a current block.

When the current block has a non-square shape in which a width thereof is greater than a height thereof, as in the example shown in (a) of FIG. 10, the left reference samples for the current block may be derived based on the adjacent reference sample line, while the top reference samples for the current block may be derived based on the non-adjacent reference sample line.

When the current block has a non-square in which a height thereof is greater than a width thereof, as in the example shown in (b) of FIG. 10, the top reference samples for the current block may be derived based on the adjacent reference sample line, while the left reference samples for the current block may be derived based on the non-adjacent reference sample line.

The modified multi-line encoding method may be used not only when the current block has the non-square shape, but also when the current block has a square shape.

An application scheme of a modified multi-line intra encoding method may be determined in consideration of values of MPMs (most probable modes) of the current block. In one example, when the values of MPMs of the current block are greater than a left-top diagonal direction (e.g., INTRA_MODE34), a modified multi-line intra encoding method in which the left reference samples are derived based on the adjacent reference sample line and the top reference samples are derived based on the non-adjacent reference sample line may be applied. To the contrary, when the values of the MPMs of the current block are smaller than the left-top diagonal direction, a modified multi-line intra encoding method in which the top reference samples are derived based on the adjacent reference sample line, and the left reference samples are derived based on the non-adjacent reference sample line may be applied. In cases other than the above cases, the modified multi-line intra encoding method may be configured not to be applied.

In the above example, the modified multi-line intra encoding method was described as being performed based on the combination of the adjacent reference sample line and the non-adjacent reference sample line. In another example, the modified multi-line intra encoding method may be implemented based on a combination of the non-adjacent reference sample lines.

Next, the intra prediction mode for the current block may be determined (S602). In this connection, at least one of a non-directional intra prediction mode or a directional intra prediction mode may be determined as the intra prediction mode for the current block. The non-directional intra prediction mode includes a planar mode and a DC mode. The directional intra prediction mode includes 33 or 65 modes from a left-bottom diagonal direction to a right-top diagonal direction.

FIG. 11 is a diagram showing intra prediction modes.

(a) of FIG. 11 shows 35 intra prediction modes. (b) in FIG. 11 shows 67 intra prediction modes.

The larger or smaller number of intra prediction modes than the number of those shown in FIG. 11 may be defined.

When the reference sample line for the current block is the non-adjacent reference sample line, the prediction method may be configured not to use the non-directional intra prediction mode. In one example, when the reference sample line for the current block is the first non-adjacent reference sample line, the second non-adjacent reference sample line or the third non-adjacent reference sample line, the DC mode or the planar mode may be set as the intra prediction mode for the current block.

Alternatively, when the reference sample line for the current block is the non-adjacent reference sample line, the prediction method may be configured not to use at least one of the non-directional intra prediction mode or the intra prediction mode of a specific direction. The non-directional intra prediction mode includes at least one of the DC mode or the planar mode. The intra prediction mode having a specific direction may include at least one of a horizontal directional intra prediction mode (e.g., INTRA_MODE18 shown in (b) in FIG. 11), a vertical directional intra prediction mode (e.g., INTRA_MODE50 shown in (b) in FIG. 11) or a diagonal directional intra prediction mode (e.g., INTRA_MODE2, INTRA_34 or INTRA_MODE66 shown in (b) of FIG. 11).

Alternatively, when the modified multi-line intra encoding method is applied, the prediction method may be configured not to use a preset intra prediction mode. In this connection, the preset intra prediction mode may include at least one of the non-directional intra prediction mode (e.g., the DC or planar mode), an intra prediction mode having a predefined direction, or an intra prediction mode in which an intra prediction angle is within a predefined range. In one example, when the modified multi-line intra encoding method is applied, the prediction method may be configured to use only an intra prediction mode whose an index is equal to or greater than the left-bottom diagonal directional intra prediction mode, and is equal to or smaller than the left-top diagonal directional intra prediction mode, or to use only an intra prediction mode whose an index is equal to or greater than the left-bottom diagonal directional intra prediction mode, and is equal to or smaller than the vertical directional intra prediction mode.

Alternatively, when the modified multi-line intra encoding method is applied, a non-available intra prediction mode may be determined based on which of the left reference samples or the top reference samples are derived based on the adjacent reference sample line. In one example, when the left reference samples are derived based on the adjacent reference sample line, the prediction method may be configured to use only an intra prediction mode whose an index is equal to or greater than the left-bottom diagonal directional intra prediction mode, and is equal to or smaller than the left-top diagonal directional intra prediction mode. To the contrary, when the top reference samples are derived based on the adjacent reference sample line, the prediction method may be configured to use only an intra prediction mode whose an index is equal to or greater than the left-top diagonal directional intra prediction mode and is equal to or smaller than the right-top diagonal directional intra prediction mode.

Information indicating whether an MPM identical with the intra prediction mode for the current block is included in the MPM list may be signaled. The information may be a 1-bit flag and may be referred to as an MPM flag. When the MPM flag indicates that an MPM identical with the current block's intra prediction mode is included in the MPM list, the intra prediction mode for the current block may be derived based on at least one of a default mode or a most probable mode (MPM).

The default mode may include at least one of the DC mode, the planar mode, the vertical directional intra prediction mode, the horizontal directional intra prediction mode, or the diagonal directional intra prediction mode. Information indicating whether the current block's intra prediction mode is identical with the default mode may be signaled in a bitstream. The information may be a 1-bit flag.

When the flag indicates that the current block's intra prediction mode is the default mode, and a plurality of intra prediction modes are set as default modes, index information indicating one of the default modes may be further signaled. The intra prediction mode for the current block may be set as a default mode indicated by the index information.

When the intra prediction mode for the current block is not identical with the default mode, the intra prediction mode for the current block may be derived based on the MPM list Whether the default mode is available, the number of default modes or a type of the default mode may be determined based on the index of the reference sample line for the current block. In one example, at least one of whether the default mode is available, the number of default modes, or the type of default mode when the adjacent reference sample line is determined as the reference sample line for the current block may be different from that when the non-adjacent reference sample line is determined as the reference sample line for the current block. In one example, when the adjacent reference sample line is determined as the reference sample line for the current block, the intra prediction mode for the current block may be derived based on a determination result of whether the intra prediction mode for the current block is identical with the default mode. To the contrary, when the non-adjacent reference sample line is determined as the reference sample line for the current block, it may be determined that the intra prediction mode for the current block is different from the default mode, and then the intra prediction mode for the current block may be derived. Accordingly, when the index of the reference sample line is not 0, the default mode flag may not be signaled, but the value of the default mode flag may be set to a predefined value (i.e., false).

Alternatively, when the adjacent reference sample line is determined as the reference sample line for the current block, the intra prediction mode for the current block may be derived using the default mode as at least one of the DC mode, the planar mode, the vertical directional intra prediction mode or the horizontal directional intra prediction mode. To the contrary, when the non-adjacent reference sample line is determined as the reference sample line for the current block, the intra prediction mode for the current block may be derived not using the default mode(s) which is used when the adjacent reference sample line is determined as the reference sample line for the current block. In one example, when the non-adjacent reference sample line is determined as the reference sample line for the current block, the intra prediction mode for the current block may be derived using the default mode, including the diagonal directional intra prediction mode.

Alternatively, the MPM may be derived based on the default mode. In one example, at least one of the DC mode, the planar mode, and an intra prediction mode having a specific direction may be set as the MPM. In this connection, at least one of whether the default mode may be set as the MPM, the number of the default modes that may be set as the MPM or the type of the default mode that may be set as the MPM may be determined based on the index of the reference sample line for the current block. In one example, at least one of whether the default mode may be set as the MPM, the number of the default modes that may be set as the MPM, or the type of the default mode that may be set as the MPM when the adjacent reference sample line is determined as the reference sample line for the current block may be different from that when the non-adjacent reference sample line is determined as the reference sample line for the current block. In one example, when the adjacent reference sample line is determined as the reference sample line for the current block, the MPM may be derived using the default mode as at least one of the DC mode, the planar mode, and the vertical directional intra prediction mode or the horizontal directional intra prediction mode. To the contrary, when the non-adjacent reference sample line is determined as the reference sample line for the current block, the MPM may be derived not using the available default mode(s) used when the adjacent reference sample line is determined as the reference sample line for the current block. In one example, when the non-adjacent reference sample line is determined as the reference sample line for the current block, the MPM may be derived using a default mode including the diagonal directional intra prediction mode.

Hereinafter, an MPM derivation method will be described in detail.

The MPM may be derived based on an intra prediction mode of a neighboring block adjacent to the current block. In this connection, the neighboring block may include at least one of a left neighboring block adjacent to the left of the current block, a top neighboring block adjacent to the top of the current block, a left-top neighboring block adjacent to a left-top corner of the current block, a right-top neighboring block adjacent to a right-top corner of the current block or a left-bottom neighboring block adjacent to a left-bottom corner of the current block. When coordinate of a left-top sample of the current block is (0, 0), the left neighboring block may include a sample at a position (−1, 0), (−1, H−1) or (−1, (H−1)/2). In this connection, H represents the height of the current block. The top neighboring block may include a sample at a position (0, −1), (W−1, −1) or ((W−1)/2, −1). In this connection, W represents the width of the current block. The left-top neighboring block may include a sample at a position (−1, −1). The right-top neighboring block may include a sample at a position (W, −1). The left-bottom neighboring block may include a sample at a position (−1, H).

The number or the position of the neighboring blocks used to derive the MPM may be determined based on the index of the reference sample line for the current block. In one example, when the adjacent reference sample line is determined as the reference sample line for the current block, the top neighboring block and the left neighboring block may be used to derive the MPM. To the contrary, when the non-adjacent reference sample line is determined as the reference sample line for the current block, the MPM may be derived using the top neighboring block and the left neighboring block, and at least one of the left-top neighboring block, the right-top neighboring block, the left-bottom neighboring block.

When the neighboring block is encoded using general intra prediction, the MPM may be derived based on the intra prediction mode of the neighboring block. In one example, the intra prediction mode of the left neighboring block may be set to a variable candIntraPredModeA, and the intra prediction mode of the top neighboring block may be set to a variable candIntraPredModeB.

In this connection, when the neighboring block is unavailable (e.g., when the neighboring block has not yet been encoded/decoded or when a position of the neighboring block is outside a picture boundary), when the neighboring block is encoded using matrix based intra prediction, when the neighboring block is encoded using inter prediction or when the neighboring block and the current block are not included in the same coding tree unit, a variable candIntraPredModeX (X is A or B) derived based on the intra prediction mode for the neighboring block may be set as a default mode. In this connection, the default mode may include at least one of the planar mode, the DC mode, the vertical direction mode or the horizontal direction mode.

Alternatively, when the neighboring block is encoded using matrix based intra prediction, the intra prediction mode corresponding to an index value used for specifying one of matrices may be set to the variable candIntraPredModeX. To this end, a lookup table indicating a mapping relationship between the index values for specifying the matrices and the intra prediction modes may be pre-stored in the encoder and the decoder.

MPMs may be derived based on the variable candIntraPredModeA and the variable candIntraPredModeB. In one example, candIntraPredModeA and candIntraPredModeB may be set as the MPM, or the intra prediction mode similar to a larger or smaller value of the candIntraPredModeA and the candIntraPredModeB may be set as the MPM. In this connection, an intra prediction mode similar to candIntraPredModeX (X is A or B) may be an intra prediction mode having an index difference of ±1 or ±2 from candIntraPredModeX.

The number of MPMs included in the MPM list may be preset in the encoder and the decoder. In one example, the number of MPMs may be 3, 4, 5 or 6. Alternatively, information indicating the number of MPMs may be signaled in a bitstream. Alternatively, the number of MPMs may be determined based on at least one of the prediction encoding mode of the neighboring block, the size, or the shape of the current block, or the index of the reference sample line for the current block. In one example, when the adjacent reference sample line is determined as the reference sample line for the current block, N MPMs may be used. When the non-adjacent reference sample line is determined as the reference sample line for the current block, M MPMs may be used. M is a natural number smaller than N. In one example, N may be 6 or 5, and M may be 5, 4 or 3. In one example, when the index of the reference sample line for the current block is 0, and the MPM flag is true, the intra prediction mode for the current block is determined as one of six candidate intra prediction modes. To the contrary, when the index of the reference sample line for the current block is greater than 0, and the MPM flag is true, the intra prediction mode for the current block may be determined as one of five candidate intra prediction modes.

Alternatively, a fixed number (e.g., 6 or 5) of MPM candidates may be used regardless of the index of the reference sample line for the current block.

In embodiments as will be described below, it is assumed that the number of MPMs is 6, and the six MPMs are referred to as MPM[0], MPM[1], MPM[2], MPM[3], MPM[4] and MPM[5], respectively. An embodiment in which the number of MPMs is smaller than six may be implemented using only some of the six MPMs as described in the embodiments as described below. Alternatively, an embodiment in which the number of MPMs is greater than six may be implemented to include the six MPMs described in the embodiments as described below.

Initial values of the MPMs may be set to the non-directional intra prediction mode or the directional intra prediction mode different from candIntraPredModeA and candIntraPredModeA. In this connection, the directional intra prediction mode that may be set as the MPM may include at least one of an intra prediction mode in a vertical direction, an intra prediction mode in a horizontal direction, an intra prediction mode in a left-bottom diagonal direction, an intra prediction mode in a left-top diagonal direction, or an intra prediction mode in a right-top diagonal direction. In one example, the initial values of MPMs may be set as follows.

$$MPM[0]=candIntraPredModeA$$

$$MPM[1]=(candIntraPredModeA==INTRA\_PLANAR\ MODE)?INTRA\_DC:INTRA\_PLANAR\ MODE$$

$$MPM[2]=INTRA\_ANGULAR50$$

$$MPM[3]=INTRA\_ANGULAR18$$

$$MPM[4]=INTRA\_ANGULAR2$$

$$MPM[5]=INTRA\_ANGULAR34$$

In the above example, ((A)? B: C) represents a function that returns a B value when a condition disclosed in A is true, and returns a C value when a condition disclosed in A is false.

When candIntraPredModeA and candIntraPredModeB are identical with each other, and candIntraPredModeA is the directional intra prediction mode, MPM[0] may be set to candIntraPredModeA, and intra prediction modes similar to candIntraPredModeA may be set as the MPMs. The intra prediction mode similar to candIntraPredModeA may be an intra prediction mode having an index difference of ±1 or ±2 from candIntraPredModeA. A modular operation (%) and an offset may be used to derive the intra prediction mode similar to candIntraPredModeA. Further, at least one of the non-directional intra prediction mode or the intra prediction mode in which a difference between an angle thereof and an angle of candIntraPredModeA is a predefined value may be set as the MPM. In this connection, the intra prediction mode in which the difference between an angle thereof and an angle of candIntraPredModeA is the predefined value may be an intra prediction mode perpendicular to candIntraPredModeA and an intra prediction mode having an opposite direction to that of candIntraPredModeA. In one example, MPMs may be derived as follows.

$$MPM[0]=candIntraPredModeA$$

$$MPM[1]=INTRA\_PLANAR\ MODE$$

$$MPM[2]=INTRA\_DC$$

$$MPM[3]=2+((candIntraPredModeA+62)\%\ 65)$$

$$MPM[4]=2+((candIntraPredModeA-1)\%\ 65)$$

$$MPM[5]=2+((candIntraPredModeA+94)\%\ 65)$$

The MPM[3] corresponds to (candIntraPredModeA−1), and MPM[4] corresponds to (candIntraPredModeA+1). MPM[5] represents an intra prediction mode that is perpendicular to candIntraPredModeA.

When candIntraPredModeA and candIntraPredModeB are different from each other, candIntraPredModeA and candIntraPredModeB may be set as the MPM[0] and MPM[1], respectively. Alternatively, candIntraPredA and candIntraPredModeB may be compared with each other and then a maximum value thereof may be set as the MPM[0] and a minimum value thereof may be set as the MPM[1]. Conversely, the minimum value may be set as the MPM[0], and the maximum value may be set as the MPM[1].

In this connection, when both candIntraPredModeA and candIntraPredModeB are directional intra prediction modes, the non-directional intra prediction mode may be set as the MPM. In one example, the planar mode and the DC mode may be set as the MPM[2] and MPM[3], respectively.

In addition, the intra prediction mode similar to one having a larger or smaller value of candIntraPredModeA and candIntraPredModeB may be set as the MPM. The intra prediction mode similar to candIntraPredModeX may be derived by adding or subtracting an offset to or from candIntraPredModeX. In this connection, a maximum size of the offset may be determined based on a difference between maximum and minimum values of candIntraPredModeA and candIntraPredModeB. In one example, the offset may be a natural number such as 1 or 2.

In one example, when a difference between MIN (candIntraPredModeA, candIntraPredModeB) and MAX (candIntraPredModeA, candIntraPredModeB) is not 64 or 1, MPM[4] and MPM[5] may be derived as follows.

$$MPM[4]=2+((MAX(MPM[0],MPM[1])+62)\%65$$

$$MPM[5]=2+((MAX(MPM[0],MPM[1]-1)\%65$$

In this connection, MAX(A, B) is a function that returns a larger value of A and B, and MIN(A, B) is a function that returns a smaller value of A and B. MPM[4] corresponds to (MAX(MPM[0], MPM[1])−1). MPM[5] corresponds to (MAX(MPM[0], MPM[1])+1). To the contrary, when the difference between MAX(candIntraPredModeA, candIntraPredModeB) and MIN(candIntraPredModeA, candIntraPredModeB) is 64 or 1, MPM[4] and MPM[5] may be derived as follows.

$$MPM[4]=2+((MAX(MPM[0],MPM[1])+61)\%65$$

$$MPM[5]=2+(MAX(MPM[0],MPM[1])\%65$$

MPM[4] corresponds to (MAX(MPM[0], MPM[1])−2), and MPM[5] corresponds to (MAX(MPM[0], MPM[1])+2).

When one of candIntraPredModeA and candIntraPredModeB is a directional intra prediction mode, and the other thereof is a non-directional intra prediction mode, at least one of a non-directional intra prediction mode not identical with MIN(candIntraPredModeA, candIntraPredModeB), a directional intra prediction mode similar to MAX(candIntraPredModeA, candIntraPredModeB), or an intra prediction mode in which a difference between an angle thereof and an angle of MAX (candIntraPredModeA, candIntraPredModeB) is a predefined value may be set as the MPM. In one example, MPM[2] to MPM[5] may be derived as follows.

$MPM[2]=!MIN(MPM[0],MPM[1])$ $MPM[3]=2+((MAX(MPM[0],MPM[1])+62)\%65$ $MPM[4]=2+((MAX(MPM[0],MPM[1])-1)\%65$ $MPM[5]=2+((MAX(MPM[0],MPM[1])+94)\%65$

MPM[2] indicates a non-directional intra prediction mode that is not identical with MPM[0] or MPM[1]. For example, when MIN(MPM[0], MPM[1]) is the DC mode, the MPM [2] may be set to the planar mode. When MIN(MPM[0], MPM[1]) is the planar mode, MPM[2] may be set to the DC mode. MPM[3] corresponds to ((MAX(MPM[0], MPM[1])−1), and MPM[4] corresponds to (MAX(MPM[0], MPM[1])+1). MPM[5] represents an intra prediction mode perpendicular to (MAX(MPM[0], MPM[1])). Unlike the examples listed above, an MPM derived by adding or subtracting 2 to or from (MAX(MPM[0], MPM[1])) may be added to the MPM list.

When one of candIntraPredA and candIntraPredB is a non-directional intra mode, and the other thereof is a directional intra prediction mode, that is, when one of candIntraPredA and PredIntraPredB is smaller than 2 and the other thereof is equal to or greater than 2, a maximum value of candIntraPredA and candIntraPredB may be set as the MPM. Further, an intra prediction mode similar to the maximum value or an intra prediction mode perpendicular to the maximum value may be set as the MPM. In one example, MPM[0] to MPM[5] may be derived as follows.

$MPM[0]=MAX(candIntraPredA,candIntraPredB)$ $MPM[1]=INTRA\_PLANAR\ MODE$ $MPM[2]=INTRA\_DC$ $MPM[3]=2+((MAX(candIntraPredA,candIntraPredB)+62)\%65$ $MPM[4]=2+((MAX(candIntraPredA,candIntraPredB)-1)\%65$ $MPM[5]=2+((MAX(candIntraPredA,candIntraPredB)+94)\%65$ MPM[3] corresponds to ((MAX(candIntraPredA, candIntraPredB)−1). MPM[4] corresponds to (MAX(candIntraPredA, candIntraPredB)+1). MPM[5] represents an intra prediction mode perpendicular to (MAX(candIntraPredA, candIntraPredB)). Unlike the examples as listed above, the MPM derived by adding or subtracting 2 to or from (MAX (candIntraPredA, candIntraPredB)) may be added to the MPM list.

MPMs may be derived based on the index of the reference sample line for the current block. In particular, when the non-adjacent reference sample line is determined as the reference sample line for the current block, a non-directional prediction mode such as the planar mode or the DC mode may not be set as the MPM. In one example, initial values of MPMs may be set as follows depending on whether the adjacent reference sample line is determined as the reference sample line for the current block.

$MPM[0]=(IntraLumaRefLineIdx==0)?candIntraPredModeA:INTRA\_ANGULAR2$ $MPM[1]=(IntraLumaRefLineIdx==0)?(candIntraPredModeA:==INTRA\_PLANAR?INTRA\_DC:INTRA\_PLANAR): INTRA\_ANGULAR18$ $MPM[2]=INTRA\_ANGULAR50$ $MPM[3]=(IntraLumaRefLineIdx==0)?INTRA\_ANGULAR18: INTRA\_ANGULAR34$ $MPM[4]=(IntraLumaRefLineIdx==0)?INTRA\_ANGULAR2: INTRA\_ANGULAR66$ $MPM[5]=(IntraLumaRefLineIdx==0)?INTRA\_ANGULAR34: INTRA\_ANGULAR42$ When the reference sample line for the current block is the non-adjacent reference sample line, and both of the candIntraPredModeA and candIntraPredModeB are directional intra prediction modes, MPMs may be derived as follows.

$MPM[0]=candIntraPredModeA$ $MPM[1]=candIntraPredModeB$ $MPM[2]=INTRA\_ANGULAR2$ $MPM[3]=INTRA\_ANGULAR18$ $MPM[4]=INTRA\_ANGULAR50$ $MPM[5]=INTRA\_ANGULAR34$ When the reference sample line for the current block is the non-adjacent reference sample line, one of candIntraPredModeA and candIntraPredModeB is the non-directional intra prediction mode, and the other thereof is the directional intra prediction mode, MPMs may be derived as follows.

$MPM[0]=MAX(candIntraPredModeA,candIntraPredModeB)$ $MPM[1]=INTRA\_ANGULAR2$ $MPM[2]=INTRA\_ANGULAR18$ $MPM[3]=INTRA\_ANGULAR50$ $MPM[4]=INTRA\_ANGULAR34$ $MPM[5]=INTRA\_ANGULAR66$ The MPM list including a plurality of MPMs may be generated. An intra prediction mode for the current block may be derived based on the value of the MPM flag. When the MPM flag indicates that an MPM identical with the intra prediction mode for the current block is included in the MPM list, and that the intra prediction mode for the current block is not the default mode, index information identifying one of the MPMs may be signaled in a bitstream. In one example, index information mpm_idx specifying one of the plurality of MPMs may be signaled in a bitstream. The MPM specified by the index information may be set to the intra prediction mode for the current block. When the MPM flag indicates that the MPM identical with the intra prediction mode for the current block is not included in the MPM list, remaining mode information indicating one of remaining intra prediction modes except for the default mode and the MPMs may be signaled in a bitstream.

When a non-adjacent reference sample line is determined as a reference sample line for the current block, the signaling of the MPM flag may be omitted, and index information identifying one of the MPMs may be signaled in a bitstream. That is, when the non-adjacent reference sample line is determined as the reference sample line for the current block, the MPM flag may be considered to be 1, and the intra prediction mode for the current block may be derived from the MPM list.

The remaining mode information refers to the index value corresponding to the intra prediction mode for the current block when the index is reassigned to each of the remaining intra prediction modes excluding the MPMs. The decoder may sort the MPMs in an ascending order, and may compare the remaining mode information with the MPMs, and may determine the intra prediction mode for the current block based on the comparison result. In one example, when the remaining mode information is smaller than or equal to the MPM, the intra prediction mode for the current block may be derived by adding 1 to the remaining mode information.

When deriving the intra prediction mode for the current block, comparison of some of the MPMs with the remaining mode information may be omitted. In one example, MPMs as the non-directional intra prediction modes among the MPMs may be excluded in the comparison operation. When the non-directional intra prediction modes are set as the MPMs, it is obvious that the residual mode information indicates the directional intra prediction mode. Thus, the intra prediction mode for the current block may be derived based on the comparing result between the remaining mode information and the residual MPMs except for the non-directional intra prediction modes. Instead of excluding the non-directional intra prediction modes in the comparison operation, the number of non-directional intra prediction modes may be added to the remaining mode information, and the added result may be compared with the remaining MPMs.

When a flag indicating whether the intra prediction mode for the current block is identical with the default mode is signaled, the intra prediction mode which is identical to the default mode may not be set as the MPM. In one example, when the default mode flag indicates whether the intra prediction mode for the current block is the planar mode, the intra prediction mode for the current block may be derived using five MPMs except for the MPM corresponding to the planar mode.

When an intra-prediction mode for the current block is determined, prediction samples for the current block may be obtained based on the determined intra-prediction mode S603.

When the DC mode is selected, prediction samples for the current block may be generated based on an average value of the reference samples. In detail, values of all of samples within the prediction block may be generated based on an average value of the reference samples. An average value may be derived using at least one of top reference samples adjacent to the top of the current block, and left reference samples adjacent to the left of the current block.

The number or a range of the reference samples used when deriving an average value may vary based on the shape of the current block. In an example, when a current block is a non-square block where a width is greater than a height, an average value may be calculated by using top reference samples. To the contrary, when a current block is a non-square block where a width is smaller than a height, an average value may be calculated by using left reference samples. In other words, when a width and a height of the current block are different, reference samples adjacent to the greater length may be used so as to calculate an average value. Alternatively, whether to calculate an average value by using top reference samples or by using left reference samples may be determined on the basis of a ratio between a width and a height of the current block.

When a planar mode is selected, a prediction sample may be obtained by using a horizontal directional prediction sample and a vertical directional prediction sample. In this connection, the horizontal directional prediction sample may be obtained on the basis of a left reference sample and a right reference sample which are positioned at the same horizontal line with the prediction sample, and the vertical directional prediction sample may be obtained on the basis of an top reference sample and a bottom reference sample which are positioned at the same vertical line with the prediction sample. In this connection, the right reference sample may be generated by copying a reference sample adjacent to the top-right corner of the current block, and the bottom reference sample may be generated by copying a reference sample adjacent to the lower-left corner of the current block. The horizontal directional prediction sample may be obtained on the basis of a weighted sum of the left reference sample and the right reference sample, and the vertical directional prediction sample may be obtained on the basis of a weighted sum of the top reference sample and the bottom reference sample. In this connection, a weighting factor assigned to each reference sample may be determined according to a position of the prediction sample. The prediction sample may be obtained on the basis of an average or a weighted sum of the horizontal directional prediction sample and the vertical directional prediction sample. When a weighted sum is used, a weighting factor assigned to the horizontal directional prediction sample and the vertical directional prediction sample may be determined on the basis of a position of the prediction sample.

When a directional prediction mode is selected, a parameter representing a prediction direction (or prediction angle) of the selected directional prediction mode may be determined. Table 2 below represents an intra directional parameter of intraPredAng for each intra-prediction mode.

TABLE 2

| PredModeIntra | 1 | 2 | 3 | 4 | 5 | 6 | 7 |
|---|---|---|---|---|---|---|---|
| IntraPredAng | — | 32 | 26 | 21 | 17 | 13 | 9 |
| PredModeIntra | 8 | 9 | 10 | 11 | 12 | 13 | 14 |
| IntraPredAng | 5 | 2 | 0 | −2 | −5 | −9 | −13 |
| PredModeIntra | 15 | 16 | 17 | 18 | 19 | 20 | 21 |
| IntraPredAng | −17 | −21 | −26 | −32 | −26 | −21 | −17 |
| PredModeIntra | 22 | 23 | 24 | 25 | 26 | 27 | 28 |
| IntraPredAng | −13 | −9 | −5 | −2 | 0 | 2 | 5 |
| PredModeIntra | 29 | 30 | 31 | 32 | 33 | 34 | |
| IntraPredAng | 9 | 13 | 17 | 21 | 26 | 32 | |

Table 2 represents an intra directional parameter of each intra-prediction mode where an index thereof is one of 2 to 34 when 35 intra-prediction modes are defined. When directional intra-prediction modes are defined more than 33, an intra directional parameter of each intra-prediction mode may be set by subdividing Table 2.

Top reference samples and left reference samples for the current block are arranged in a line, and then a prediction sample may be obtained on the basis of a value of an intra directional parameter. In this connection, when a value of the intra directional parameter is a negative value, left reference samples and top reference samples may be arranged in a line.

FIGS. 12 and 13 are views respectively showing examples of one-dimensional arrangement where reference samples are arranged in a line.

FIG. 12 is a view showing vertical directional one-dimensional arrangement where reference samples are arranged in a vertical direction, and FIG. 13 is a view showing horizontal directional one-dimensional arrangement where reference samples are arranged in a horizontal direction. Examples of FIGS. 12 and 13 will be described in assumption that 35 intra-prediction modes are defined.

When an intra-prediction mode index is any one of 11 to 18, horizontal directional one-dimensional arrangement may be applied where top reference samples are rotated in counterclockwise, and when an intra-prediction mode index is any one of 19 to 25, vertical directional one-dimensional arrangement may be applied where left reference samples are rotated in clockwise. When arranging reference samples in a line, an intra-prediction mode angle may be considered.

A reference sample determining parameter may be determined on the basis of an intra directional parameter. The reference sample determining parameter may include a reference sample index for specifying a sample, and a weighting factor parameter for determining a weighting factor applied to the reference sample.

A reference sample index, iIdx, and a weighting factor parameter, ifact, may be respectively obtained through Equations 4 and 5 below.

$$iIdx=(y+1)*P_{ang}/32 \quad \text{[Equation 4]}$$

$$i_{fact}=[(y+1)*P_{ang}]\&31 \quad \text{[Equation 5]}$$

In Equations 4 and 5, Pang represents an intra directional parameter. A reference sample specified by a reference sample index of iIdx corresponds to an integer pel.

In order to derive a prediction sample, at least one reference sample may be specified. In detail, according to a slope of a prediction mode, a position of a reference sample used for deriving a prediction sample may be specified. In an example, a reference sample used for deriving a prediction sample may be specified by using a reference sample index of iIdx.

In this connection, when a slope of an intra-prediction mode is not represented by one reference sample, a prediction sample may be generated by performing interpolation on a plurality of reference samples. In an example, when a slope of an intra-prediction mode is a value between a slope between a prediction sample and a first reference sample, and a slope between the prediction sample and a second reference sample, the prediction sample may be obtained by performing interpolation on the first reference sample and the second reference sample. In other words, when an angular line according to an intra-prediction angle does not pass a reference sample positioned at an integer pel, a prediction sample may be obtained by performing interpolation on reference samples positioned adjacent to the left and the right, or the top and the bottom of the position where the angular line passes.

Equation 6 below represents an example of obtaining a prediction sample on the basis of reference samples.

$$P(x,y)=((32-i_{fact})/32)*\text{Ref\_1}D(x+iIdx+1)+(i_{fact}/32)*\text{Ref\_1}D(x+iIdx+2) \quad \text{[Equation 6]}$$

In Equation 6, P represents a prediction sample, and Ref_1D represents any one of reference samples that are arranged in a line. In this connection, a position of the reference sample may be determined by a position (x, y) of the prediction sample and a reference sample index of iIdx.

When a slope of an intra-prediction mode is possibly represented by one reference sample, a weighting factor parameter of ifact is set to 0. Accordingly, Equation 6 may be simplified as Equation 7 below.

$$P(x,y)=\text{Ref\_1}D(x+iIdx+1) \quad \text{[Equation 7]}$$

Intra-prediction for a current block may be performed on the basis of a plurality of intra-prediction modes. In an example, an intra-prediction mode may be derived for each prediction sample, and a prediction sample may be derived on the basis of an intra-prediction mode assigned to each prediction sample.

Alternatively, an intra-prediction mode may be derived for each region, intra-prediction for each region may be performed on the basis of an intra-prediction mode assigned to each region. In this connection, the region may include at least one sample. At least one of a size and a shape of the region may be adaptively determined on the basis of at least one of a size of the current block, a shape of the current block, and an intra-prediction mode for the current block. Alternatively, at least one of a size and a shape of the region may be predefined in the encoder and the decoder independent to a size or shape of the current block.

Alternatively, intra-prediction may be performed for each of a plurality of intra-predictions, and a final prediction sample may be derived by calculating an average or a weighted sum of a plurality of prediction samples obtained through the intra-predictions. In an example, a first prediction sample may be obtained by performing intra-prediction on the basis of a first intra-prediction mode, and a second prediction sample may be obtained by performing intra-prediction on the basis of a second intra-prediction mode. Subsequently, a final prediction sample may be obtained by calculating an average or a weighted sum of the first prediction sample and the second prediction sample. In this connection, a weighting factor assigned to each of the first prediction sample and the second prediction sample may be determined according to at least one of whether the first intra-prediction mode is a non-directional/directional prediction mode, whether the second intra-prediction mode is a non-directional/directional prediction mode, or an intra-prediction mode of the neighboring block.

A plurality of intra-prediction modes may be a combination of a non-directional intra-prediction mode and a directional prediction mode, a combination of directional prediction modes, or a combination of non-directional prediction modes.

FIG. 14 is a view showing a degree formed between directional intra-prediction modes and a straight line parallel to an x axis.

As an example shown in FIG. 14, directional prediction modes may be present between the lower-left diagonal direction and the top-right diagonal direction. Describing a degree formed between the x axis and a directional prediction mode, directional prediction modes may be present from 45 degrees (bottom-left diagonal direction) to −135 degrees (top-right diagonal direction).

When a current block is a non-square, a case may be present where a prediction sample is derived by using, among reference samples positioned at the angular line according to an intra-prediction angle, a reference sample that is positioned farther than a reference sample close to a prediction sample according to an intra-prediction mode for the current block.

FIG. 15 is a view shown an aspect of obtaining a prediction sample when a current block is a non-square.

In an example, as an example shown in FIG. 15 (a), it is assumed that a current block is a non-square where a width is greater than a height, and an intra-prediction mode for the current block is a directional intra-prediction mode having an angle from 0 degree to 45 degrees. In the above case, when deriving a prediction sample A around a right column of the current block, among reference samples positioned at the angular mode according to the above degree, rather than using a top reference sample T close to the prediction sample, a case may be present where a left reference sample L far away from the prediction sample is used.

In another example, as an example shown in FIG. 15 (b), it is assumed that a current block is a non-square where a height is greater than a width, and an intra-prediction mode for the current block is a directional intra-prediction mode from −90 degrees to −135 degrees. In the above case, when deriving a prediction sample A around a bottom row of the current block, among reference samples positioned at the angular mode according to the above degree, rather than using a left reference sample L close to the prediction sample, a case may be present where a top reference sample T far away from the prediction sample is used.

To solve the above problem, when a current block is a non-square, an intra-prediction mode for the current block may be substituted with an intra-prediction mode in opposite direction. Accordingly, for a non-square block, directional prediction modes having angles greater or smaller than those of directional prediction modes shown in FIG. 11 may be used. The above directional intra-prediction mode may be defined as a wide angle intra-prediction mode. A wide angle intra-prediction mode represents a directional intra-prediction mode that does not belong to a range of 45 degrees to −135 degrees.

FIG. 16 is a view showing wide angle intra-prediction modes.

In an example show in FIG. 16, intra-prediction modes having indices from −1 to −14 and intra-prediction modes having indices from 67 to 80 represent wide angle intra-prediction modes.

In FIG. 16, 14 wide angle intra-prediction modes (from −1 to −14) which are greater in angle than 45 degrees and 4 wide angle intra-prediction modes (from 67 to 80) which are smaller in angle than −135 degrees are shown. However, more or fewer number of wide angle intra-prediction modes may be defined.

When a wide angle intra-prediction mode is used, a length of top reference samples may be set to 2W+1, and a length of left reference samples may be set to 2H+1.

By using a wide angle intra-prediction mode, a sample A shown in FIG. 15 (a) may be predicted by using a reference sample T, and a sample A shown in FIG. 15 (b) may be predicted by a reference sample L.

In addition to legacy intra-prediction modes and N wide angle intra-prediction modes, a total of 67+N intra-prediction modes may be used. In an example, Table 3 represents an intra directional parameter for intra-prediction modes when 20 wide angle intra-prediction modes are defined.

TABLE 3

| PredModeIntra | −10 | −9 | −8 | −7 | −6 | −5 | −4 | −3 | −2 |
|---|---|---|---|---|---|---|---|---|---|
| intraPredAngle | 114 | 93 | 79 | 68 | 60 | 54 | 49 | 45 | 39 |
| PredModeIntra | −1 | 2 | 3 | 4 | 5 | 6 | 7 | 8 | 9 |
| intraPredAngle | 35 | 32 | 29 | 26 | 23 | 21 | 19 | 17 | 15 |
| PredModeIntra | 10 | 11 | 12 | 13 | 14 | 15 | 16 | 17 | 18 |
| intraPredAngle | 13 | 11 | 9 | 7 | 5 | 3 | 2 | 1 | 0 |
| PredModeIntra | 19 | 20 | 21 | 22 | 23 | 24 | 25 | 26 | 27 |
| intraPredAngle | −1 | −2 | −3 | −5 | −7 | −9 | −11 | −13 | −15 |
| PredModeIntra | 28 | 29 | 30 | 31 | 32 | 33 | 34 | 35 | 36 |
| intraPredAngle | −17 | −19 | −21 | −23 | −26 | −29 | −32 | −29 | −26 |
| PredModeIntra | 37 | 38 | 39 | 40 | 41 | 42 | 43 | 44 | 45 |
| intraPredAngle | −23 | −21 | −19 | −17 | −15 | −13 | −11 | −9 | −7 |
| PredModeIntra | 46 | 47 | 48 | 49 | 50 | 51 | 52 | 53 | 54 |
| intraPredAngle | −5 | −3 | −2 | −1 | 0 | 1 | 2 | 3 | 5 |
| PredModeIntra | 55 | 56 | 57 | 58 | 59 | 60 | 61 | 62 | 63 |
| intraPredAngle | 7 | 9 | 11 | 13 | 15 | 17 | 19 | 21 | 23 |
| PredModeIntra | 64 | 65 | 66 | 67 | 68 | 69 | 70 | 71 | 72 |
| intraPredAngle | 26 | 29 | 32 | 35 | 39 | 45 | 49 | 54 | 60 |
| PredModeIntra | 73 | 74 | 75 | 76 | | | | | |
| intraPredAngle | 68 | 79 | 93 | 114 | | | | | |

When a current block is a non-square, and an intra-prediction mode for the current block which is obtained in S602 belongs to a transform range, the intra-prediction mode for the current block may be transformed into a wide angle intra-prediction mode. The transform range may be determined on the basis of at least one of a size, a shape, or a ratio of the current block. In this connection, the ratio may represent a ratio between a width and a height of the current block.

When a current block is a non-square where a width is greater than a height, a transform range may be set from an intra-prediction mode index (for example, 66) of an top-right diagonal direction to (an intra-prediction mode index of the top-right diagonal direction−N). In this connection, N may be determined on the basis of a ratio of the current block. When an intra-prediction mode for the current block belongs to a transform range, the intra-prediction mode may be transformed into a wide angle intra-prediction mode. The transform may be subtracting a predefined value from the intra-prediction mode, and the predefined value may be the total number (for example, 67) of intra-prediction modes excluding a wide angle intra-prediction mode.

In the above example, intra-prediction mode from the number 66 to the number 53 may be respectively transformed into wide angle intra-prediction modes from the number −1 to the number −14.

When a current block is a non-square where a height is greater than a width, a transform range may be set from an intra-prediction mode index (for example, 2) of a bottom-left diagonal direction to (the intra-prediction mode index of the lower-left diagonal direction+M). In this connection, M may be determined on the basis of a ratio of the current block. When an intra-prediction mode for the current block belongs to a transform range, the intra-prediction mode may be transformed into a wide angle intra-prediction mode. The transform may be adding a predefined value to the intra-prediction mode, and the predefined value may be the total number (for example, 65) of directional intra-prediction mode excluding a wide angle intra-prediction mode.

In the above example, intra-prediction mode from the number 2 to the number 15 may be respectively transformed into wide angle intra-prediction modes from the number 67 to the number 80

Hereinafter, intra-prediction modes belonging to a transform range are referred to as wide angle replacement intra prediction modes.

A transform range may be determined on the basis of a ratio of the current block. In an example, Tables 4 and 5 respectively show a transform range of a case where 35 intra-prediction modes excluding a wide angle intra-prediction mode are defined, and a case where 67 intra-prediction modes excluding a wide angle intra-prediction mode are defined.

TABLE 4

| Condition | Replaced Intra Prediction Modes |
|---|---|
| W/H = 2 | Modes 2, 3, 4 |
| W/H > 2 | Modes 2, 3, 4, 5, 6 |
| W/H = 1 | None |
| H/W = ½ | Modes 32, 33, 34 |
| H/W < ½ | Modes 30, 31, 32, 33, 34 |

TABLE 5

| Condition | Replaced Intra Prediction Modes |
|---|---|
| W/H = 2 | Modes 2, 3, 4, 5, 6, 7 |
| W/H > 2 | Modes 2, 3, 4, 5, 6, 7, 8, 9, 10, 11 |
| W/H = 1 | None |
| H/W = ½ | Modes 61, 62, 63, 64, 65, 66 |
| H/W < ½ | Modes 57, 58, 59, 60, 61, 62, 63, 64, 65, 66 |

As examples shown in Tables 4 and 5, the number of wide angle replacement intra prediction modes included in a transform range may vary according to a ratio of the current block.

The ratio of the current block may be further subdivided to set a transform range as shown in Table 6 below.

TABLE 6

| Condition | Replaced Intra Prediction Modes |
|---|---|
| W/H = 16 | Modes 12, 13, 14, 15 |
| W/H = 8 | Modes 12, 13 |
| W/H = 4 | Modes 2, 3, 4, 5, 6, 7, 8, 9, 10, 11 |
| H/W = 2 | Modes 2, 3, 4, 5, 6, 7 |
| H/W = 1 | None |
| W/H = ½ | Modes 61, 62, 63, 64, 65, 66 |
| W/H = ¼ | Modes 57, 58, 59, 60, 61, 62, 63, 64, 65, 66 |
| W/H = ⅛ | Modes 55, 56 |
| H/W = 1/16 | Modes 53, 54, 55, 56 |

When the non-adjacent reference sample line is determined as the reference sample line for the current block or when the multi-line intra prediction encoding method for selecting one of the plurality of reference sample lines is used, the prediction method may be configured not to use the wide angle intra prediction mode. That is, although the current block has a non-square shape, and the intra prediction mode for the current block belongs to the transform range, the intra prediction mode for the current block may not be transformed into the wide angle intra prediction mode.

Alternatively, when the intra prediction mode for the current block is determined as the wide angle intra prediction mode, the prediction method may be configured such that the non-adjacent reference sample lines are unavailable as the reference sample line for the current block or may be configured not to use the multi-line intra prediction encoding method for selecting one of the plurality of reference sample lines. When the multi-line intra prediction encoding method is not used, the adjacent reference sample line may be determined as the reference sample line for the current block.

Alternatively, even when the non-adjacent reference sample line is determined as the reference sample line for the current block, the wide angle replacement intra prediction mode may be changed to the wide angle intra prediction mode. In this connection, at least one of the number of available wide angle intra prediction modes or wide angle replacement intra prediction modes or a maximum angle of the wide angle intra prediction modes may be adaptively determined based on the index of the reference sample line for the current block. In one example, when the adjacent reference sample line is determined as the reference sample line for the current block, up to N wide angle intra prediction modes may be used. To the contrary, when the non-adjacent reference sample line is determined as the reference sample line for the current block, up to M wide angle intra prediction modes may be used. In this connection, N and M may be different natural numbers.

Alternatively, the angle of the wide angle intra prediction mode when the adjacent reference sample line is determined as the reference sample line for the current block may be different from that when the non-adjacent reference sample line is determined as the reference sample line for the current block. In one example, when the adjacent reference sample line is determined as the intra prediction mode for the current block, a wide angle intra prediction mode having an index N has a first angle value. To the contrary, when the non-adjacent reference sample line is determined as the intra prediction mode for the current block, a wide angle intra prediction mode having an index N may have a second angle value.

FIG. 17 shows an example in which the wide angle intra prediction mode has an angle varying based on an index of a reference sample line for a current block.

When the adjacent reference sample line is determined as the reference sample line for the current block, a maximum angle of the wide angle intra prediction mode may be set to α. To the contrary, when the non-adjacent reference sample line is determined as the reference sample line for the current block, the maximum angle of the wide angle intra prediction mode may be set to β.

The angle of the wide angle intra prediction mode may vary based on the index of the non-adjacent reference sample line. In this connection, as the index of the reference sample line for the current block increases, the angle of the wide angle intra prediction mode may increase or decrease.

In another example, the wide angle intra prediction mode derived based on the wide angle replacement intra prediction mode may vary based on the index of the reference sample line for the current block. Specifically, the wide angle intra prediction mode for the current block may be derived by deriving an offset based on the index of the reference sample line, and then adding or subtracting the offset to or from a value obtained by adding or subtracting a predefined value to or from the wide angle replacement intra prediction mode.

Alternatively, the number or the range of wide angle replacement intra prediction modes may vary depending on the index of the reference sample line for the current block. An offset may be derived based on the index of the reference sample line for the current block. The intra prediction mode for the current block may be compared with a threshold derived based on the offset. Then, it may be determined based on the comparison result whether the intra prediction mode for the current block is the wide angle intra replacement mode. The offset may be derived based on a following Equation 8 or Equation 9.

$$\text{wideOffset} = \text{intra\_luma\_ref\_idx} \quad \text{[Equation 8]}$$

$$\text{wideOffset} = \text{intra\_luma\_ref\_idx} = 0?0:((\text{intra\_lumaref\_idx} == 1)?1:3) \quad \text{[Equation 9]}$$

In Equation 8 and Equation 9, wideOffset denotes the offset, and intra_luma_ref_idx represents the index of a reference picture line. An offset when the non-adjacent reference sample line is determined as the reference sample line for the current block may be larger than an offset when the adjacent reference sample line is determined as the reference sample line for the current block.

The threshold may be derived based on the offset and the aspect ratio of the current block. In one example, when the current block has a non-square in which a width thereof is greater than a height thereof, the threshold may be defined based on a following Equation 10.

$$(\text{whRatio} > 1)?8 + 2*\text{whRatio} + \text{wideOffset}:8 + \text{wideOffset} \quad \text{[Equation 10]}$$

In Equation 10, whRatio represents the aspect ratio of the current block. whRatio may represent Log 2 (nTbW/nTbH) or an absolute value thereof.

When the current block has a non-square shape in which a width thereof is greater than a height thereof, and the intra prediction mode for the current block is equal to or greater than 2, and is smaller than the threshold, the intra prediction mode for the current block may be converted to the wide angle intra prediction mode. A following Equation 11 shows an example of transforming the wide angle replacement intra prediction mode to the wide angle intra prediction mode when the current block has a non-square shape in which a width thereof is greater than a height thereof.

$$\text{wideAngle} = \text{predModeIntra} + 65 \quad \text{[Equation 11]}$$

In Equation 11, wideAngle represents the wide angle intra prediction mode, and predModeIntra represents the wide angle replacement intra prediction mode.

When the current block has a non-square shape in which a height thereof is greater than a width thereof, the threshold may be defined based on a following Equation 12.

$$\text{whRatio} > 1)?60 - (2*\text{whRatio} + \text{wideOffset} \quad \text{[Equation 12]}$$

When the current block has a non-square shape in which a height thereof is greater than a width thereof and the intra prediction mode for the current block is smaller than or equal to 66, and greater than the threshold, the intra prediction mode for the current block may be converted to the wide angle intra prediction mode. A following Equation 13 shows an example of transforming the wide angle replacement intra prediction mode to the wide angle intra prediction mode when the current block ha a non-square shape in which a height thereof is greater than a width thereof.

$$\text{wideAngle} = \text{predModeIntra} - 67 \quad \text{[Equation 13]}$$

When the wide angle intra prediction mode is not used, each of refW and refH may be set to a sum of nTbW and nTbH. Accordingly, the non-adjacent reference sample line spaced from the current block by i may include (nTbW+nTbH+offsetX[i]) top reference samples and (nTbW+nTbH+offsetY[i]) left reference samples except for the left-top reference sample. That is, the non-adjacent reference sample line spaced from the current block by i may include (2nTbW+2nTbH+offsetX[i]+offsetY[i]+1) reference samples. For example, when a value of whRatio is greater than 1, a value of offsetX may be set to be larger than a value of offsetY. In one example, when the value of offsetX may be set to 1, and the value of offsetY may be set to 0. To the contrary, when the value of whRatio is smaller than 1, the value of offsetY may be set to be larger than the value of offsetX. In one example, the value of offsetX may be set to 0, and the value of offsetY may be set to 1.

Since wide angle intra-prediction modes are used in addition to legacy intra-prediction modes, resource for encoding wide angle intra-prediction modes may be increased, and thus encoding efficiency may be reduced. Accordingly, rather than encoding a wide angle intra-prediction mode as it is, a replaced intra-prediction mode for the wide angle intra-prediction modes are encoded so as to improve encoding efficiency.

In an example, when a current block is encoded by using a wide angle intra-prediction mode of the number 67, the number 2 that is a wide angle replacement intra-prediction mode of the number 67 may be encoded as an intra-prediction mode for the current block. In addition, when a current block is encoded by using a wide angle intra-prediction mode of the number −1, the number 66 that is a wide angle replacement intra-prediction mode of the number −1 may be encoded as an intra-prediction mode for the current block.

The decoder may decode an intra-prediction mode for the current block, and determine whether or not the decoded intra-prediction mode belongs to a transform range. When the decoded intra-prediction mode is a wide angle replacement intra-prediction mode, the intra-prediction mode may be transformed into a wide angle intra-prediction mode.

Alternatively, when a current block is encoded through a wide angle intra-prediction mode, the wide angle intra-prediction mode may be encoded as it is.

Encoding of an intra prediction mode may be performed based on an MPM list described above. Specifically, when a neighboring block is encoded in a wide angle intra prediction mode, an MPM may be set based on a wide angle replacement intra prediction mode corresponding to the wide angle intra prediction mode.

A residual image may be derived by subtracting a prediction image from an original image. In this connection, when the residual image is converted into a frequency domain, even though high frequency components are removed from frequency components, subjective image quality of the image does not drop significantly. Accordingly, when values of high frequency components are transformed into small values, or when values of high frequency components are set to 0, compression efficiency may be increased without causing large visual distortion. Reflecting the above feature, transform may be performed on a current block so as to decompose a residual image to two-dimensional frequency components. The transform may be performed by using transform methods such as DCT (discrete cosine transform), DST (discrete sine transform), etc.

DCT is a method of decomposing (or transforming) a residual image to two-dimensional frequency components by using cosine transform, and DST is a method of decomposing (or transforming) a residual image to two-dimensional frequency components by using sine transform. As a result of performing transform on a residual image, frequency components may be represented in a basic image. In an example, when DCT transform is performed on a block having an N×N size, N 2 basic pattern components may be obtained. A size of each basic pattern component included in an N×N size block may be obtained through transform. According to a used transform method, a size of a basic pattern component may be referred to as a DCT coefficient or DST coefficient.

A transform method of DCT is mainly used when performing transform on an image where a lot of low frequency components other than 0 are present. A transform method of DST is mainly used when performing transform on an image where a lot of high frequency components are present.

Transform on a residual image may be performed by using transform methods other than DCT or DST.

Hereinafter, performing transform on a residual image into two-dimensional frequency components may be referred to as two-dimensional image transform. In addition, a size of each basic pattern component obtained by transform is referred to as a transform coefficient. In an example, a transform coefficient may mean a DCT coefficient or DST coefficient. When both of first transform and second transform which will be described later are applied, a transform coefficient may mean a size of a basic pattern component generated by second transform.

A transform method may be determined on a basis of a block. A transform method may be determined on the basis of at least one of a prediction encoding mode for a current block, a size of the current block, or a size of the current block. In an example, when a current block is encoded through an intra-prediction mode, and a size of the current block is smaller than N×N, transform may be performed by using a transform method of DST. On the other hand, when the above condition is not satisfied, transform may be performed by using a transform method of DCT.

For a partial block of a residual image, two-dimensional image transform may not be performed. Not performing two-dimensional image transform may be referred to as transform skip. When transform skip is applied, quantization may be applied to residual values for which transform is not performed.

After performing transform on a current block by using DCT or DST, transform may be performed again on the transformed current block. In this connection, transform based on DCT or DST may be defined as first transform, and performing transform again on a block to which first transform is applied may be defined as second transform.

First transform may be performed by using any one of a plurality of transform core candidates. In an example, first transform may be performed by using any one of DCT2, DCT8, or DCT7.

Different transform cores may be used for a horizontal direction and a vertical direction. Information representing a combination of a transform core of a horizontal direction and a transform core of a vertical direction may be signaled in a bitstream.

A processing unit of first transform may differ with second transform. In an example, first transform may be performed on an 8×8 block, and second transform may be performed on a 4×4 sized sub-block within the transformed 8×8 block. In this connection, a transform coefficient for remaining regions for which second transform is not performed may be set to 0.

Alternatively, first transform may be performed on a 4×4 block, and second transform may be performed on a region having an 8×8 size including the transformed 4×4 block.

Information representing whether or not to perform second transform may be signaled in a bitstream.

Alternatively, whether to perform the second transform may be determined based on whether a horizontal directional transform core and a vertical directional transform core are identical with each other. In one example, the second transform may be performed only when the horizontal directional transform core and the vertical directional transform core are identical with each other. Alternatively, the second transform may be performed only when the horizontal directional transform core and the vertical directional transform core are different from each other.

Alternatively, the second transform may be allowed only when a predefined transform core is used for the horizontal directional transform and the vertical directional transform. In one example, when a DCT2 transform core is used for transform in the horizontal direction and transform in the vertical direction, the second transform may be allowed.

Alternatively, it may be determined whether to perform the second transform based on the number of non-zero transform coefficients of the current block. In one example, when the number of the non-zero transforms coefficient of the current block is smaller than or equal to a threshold, the prediction method may be configured not to use the second transform. When the number of the non-zero transform coefficients of the current block is greater than the threshold, the prediction method may be configured to use the second transform. As long as the current block is encoded using intra prediction, the prediction method may be configured to use the second transform.

A size or a shape of a sub-block to be subjected to the second transform may be determined based on the shape of the current block.

FIG. 18 and FIG. 19 is a view showing a sub-block to be subjected to a second transform.

When the current block is square, the first transform may be performed, and then the second transform may be performed on a left-top N×N sized sub-block of the current block. In one example, when the current block is an 8×8 sized coding block, the first transform may be performed on the current block, and then the second transform may be performed on a left-top 4×4 sized sub-block of the current block (see FIG. 18).

When the current block has a non-square shape in which a width thereof is 4 times larger than a height thereof, the first transform may be performed, and then the second transform may be performed on a (kN)×(4 kN) sized sub-block located at left-top of the current block. In one example, when the current block has a non-square shape of 4×16 size, the first transform may be performed on the current block, and then, the second transform may be performed on a 2×8 sized sub-block located at left-top of the current block (see (a) in FIG. 19).

When the current block has a non-square shape in which a height thereof is 4 times larger than a width thereof, the first transform may be performed, and then the second transform may be performed on a (4 kN)×(kN) sized sub-block located at left-top of the current block. In one example, when the current block has a non-square shape of 16×4 size, the first transform may be performed on the current block, and then, the second transform may be performed on a 8×2 sized sub-block located at left-top of the current block (see (b) in FIG. 19).

The decoder may perform inverse-transform (second inverse-transform) to the second transform and may perform inverse-transform (first inverse-transform) to the first transform resultant from the second inverse-transform. As a result of performing the second inverse-transform and the first inverse-transform, residual signals for the current block may be obtained.

Information indicating a transform type of the current block may be signaled in a bitstream. The information may be index information tu_mts_idx indicating one of combinations between a transform type related to a horizontal direction and a transform type related to a vertical direction.

A transform core for a vertical direction and a transform core for a horizontal direction may be determined based on transform type candidates specified by the index information tu_mts_idx. Table 7 and Table 8 show the transform type combinations based on tu_mts_idx.

TABLE 7

| tu_mts_idx | Transform type | |
| | Horizontal | Vertical |
| --- | --- | --- |
| 0 | SKIP | SKIP |
| 1 | DCT-II | DCT-II |
| 2 | DST-VII | DST-VII |
| 3 | DCT-VIII | DST-VII |
| 4 | DST-VII | DCT-VIII |
| 5 | DCT-VIII | DCT-VIII |

TABLE 8

| tu_mts_idx | Transform type | |
| | Horizontal | vertical |
| --- | --- | --- |
| 0 | DCT-II | DCT-II |
| 1 | SKIP | SKIP |
| 2 | DST-VII | DST-VII |
| 3 | DCT-VIII | DST-VII |
| 4 | DST-VII | DCT-VIII |
| 5 | DCT-VIII | DCT-VIII |

The transform type may be determined as one of DCT2, DST7, DCT8, or transform skip. Alternatively, transform type combination candidates may be composed using only transform cores except for transform skip.

When Table 7 is used, a following rule may be applied. When tu_mts_idx is 0, the transform skip may be applied to the horizontal and vertical directions. When tu_mts_idx is 1, DCT2 may be applied to the horizontal and vertical directions. When tu_mts_idx is 3, DCT8 may be applied to the horizontal direction, and DCT7 may be applied to the vertical direction.

When Table 8 is used, a following rule may be applied. When tu_mts_idx is 0, DCT2 may be applied to the horizontal direction and the vertical direction. When tu_mts_idx is 1, the transform skip may be applied to the horizontal and vertical directions. When tu_mts_idx is 3, DCT8 is applied to the horizontal direction, and DCT7 may be applied to the vertical direction.

Whether to encode the index information may be determined based on at least one of the size or the shape of the current block or the number of non-zero coefficients of the current block. In one example, when the number of non-zero coefficients is equal to or smaller than a threshold, the index information may not be signaled and the default transform type may be applied to the current block. In this connection, the default transform type may be DST7. Alternatively, the default mode may vary depending on the size, or the shape of the current block or the intra prediction mode for the current block.

The threshold may be determined based on the size or the shape of the current block. In one example, when the size of the current block is smaller than or equal to 32×32, the threshold may be set to 2. When the size of the current block is larger than 32×32 (e.g., when the current block is a 32×64 or 64×32 sized coding block), the threshold may be set to 4.

A plurality of lookup tables may be pre-stored in the encoder/decoder. The plurality of lookup tables may be different from each other in terms of at least one of index values allocated to the transform type combination candidates, types of the transform type combination candidates, or the number of the transform type combination candidates.

A lookup table for the current block may be selected based on at least one of the size or the shape of the current block, the prediction encoding mode or the intra prediction mode for the current block or whether the second transform is applied thereto or whether the transform skip has been applied to a neighboring block thereto.

In one example, when the size of the current block is 4×4 or smaller, or when the current block is encoded using the inter prediction, the lookup table of Table 7 may be used. When the size of the current block is larger than 4×4 or when the current block is encoded using the intra prediction, the lookup table in Table 8 may be used.

Alternatively, information indicating one of the plurality of lookup tables may be signaled in a bitstream. The decoder may select the lookup table for the current block based on the information.

In another example, an index assigned to the transform type combination candidate may be determined adaptively, based on at least one of the size or the shape of the current block, the prediction encoding mode or the intra prediction mode for the current block or whether the second transform is applied thereto or whether the transform skip has been applied to a neighboring block thereto. In one example, an index assigned to the transform skip when the size of the current block is 4×4 may have a smaller value than an index assigned to the transform skip when the size of the current block is greater than 4×4. Specifically, when the size of the current block is 4×4, an index 0 may be allocated to the transform skip, and when the current block is greater than 4×4 and smaller than 16×16, an index greater than 0 (e.g., index 1) may be assigned to transform skip. When the current block is larger than 16×16, an index of a maximum value (e.g., 5) may be assigned to the transform skip.

Alternatively, when the current block is encoded using inter prediction, an index 0 may be assigned to the transform skip. When the current block is encoded using intra prediction, an index greater than 0 (e.g., index 1) may be assigned to the transform skip.

Alternatively, when the current block is a block of 4×4 size encoded using inter prediction, an index 0 may be assigned to the transform skip. To the contrary, when the current block is not encoded using inter prediction, or when the current block is larger than 4×4, an index (e.g., index 1) having a value greater than 0 may be assigned to the transform skip.

Transform type combination candidates different from the transform type combination candidates listed in Tables 7 and 8 may be defined and used. In an example, a transform type combination candidate to which the transform skip is applied to one of the horizontal directional transform and the vertical directional transform, while the transform core such as DCT7, DCT8 or DST2 is applied to the other thereof may be used. In this connection, whether to use the transform skip as a transform type candidate for the horizontal direction or the vertical direction may be determined based on at least one of the size (e.g., width and/or height), or the shape of the current block, or the prediction encoding mode, or the intra prediction mode for the current block.

Alternatively, information indicating whether a specific transform type candidate is available may be signaled in a bitstream. In one example, a flag indicating whether the transform skip may be used as a transform type candidate for the horizontal direction and the vertical direction may be signaled in a bitstream. Whether a specific transform type combination candidate among the plurality of transform type combination candidates is included may be determined based on a flag.

Alternatively, whether a specific transform type candidate is applied to the current block may be signaled in a bitstream. In one example, a flag cu_mts_flag indicating whether DCT2 is applied to the horizontal direction and the vertical direction may be signaled in a bitstream. When a value of cu_mts_flag is 1, DCT2 may be set as a transform core for the vertical direction and the horizontal direction. When the value of cu_mts_flag is 0, DCT8 or DST7 may be set as transform cores for the vertical direction and the horizontal direction. Alternatively, when the value of cu_mts_flag is 0, information tu_mts_idx specifying one of the plurality of transform type combination candidates may be signaled in a bitstream.

When the current block has a non-square shape in which a width thereof is greater than a height thereof or in which a height thereof is greater than a width thereof, encoding of cu_mts_flag may be omitted, and the value of cu_mts_flag may be inferred to 0.

The number of available transform type combination candidates may be vary depending on the size or the shape of the current block or the intra prediction mode for the current block. In an example, when the current block is square, three or more transform type combination candidates may be used, and when the current block has a non-square shape, two transform type combination candidates may be used. Alternatively, when the current block is square, only transform type combination candidates in which a transform type for a horizontal direction and a transform type for a vertical direction are different from each other, among the transform type combination candidates, may be used.

When there are 3 or more transform type combination candidates that the current block may use, index information tu_mts_idx indicating one of the transform type combination candidates may be signaled. To the contrary, when there are two transform type combination candidates that the current block may use, a flag mts_flag indicating one of the transform type combination candidates may be signaled. A following Table 9 shows schemes for encoding information for specifying the transform type combination candidates based on the shape of the current block.

TABLE 9

| Residual_coding( x0, y0, log2TbWidth, log2TbHeight, cIdx ) { | Descriptor |
|---|---|
| ... | |
| if( cu_mts_flag[ x0 ][ y0 ] && ( cIdx = = 0 ) && | |
|    !transform_skip_flag[ x0 ][ y0 ][ cIdx ] && | |
|    ( ( CuPredMode[ x0 ][ y0 ] = = MODE_INTRA && numSigCoeff > 2 ) \|\| | |
|      ( CuPredMode[ x0 ][ y0 ] = = MODE_INTER ) ) ) { | |
|   if (cbHeight == cbWidth) { | |
|     mts_idx[ x0 ][ y0 ] | ae(v) |
|   } else { | |
|     mts_flag[ x0 ][ y0 ] | u(1) |
|   } | |
| } | |

Indexes of the transform type combination candidates may be rearranged (or reordered) depending on the shape of the current block. In one example, indexes assigned to the transform type combination candidates when the current block is square may be different from indexes assigned to the transform type combination candidates when the current block is non-square. In one example, when the current block is square, a transform type combination may be selected based on a following Table 10. When the current block is non-square, a transform type combination may be selected based on a following Table 11.

TABLE 10

| | INTRA | | INTER | |
|---|---|---|---|---|
| mts_idx<br>mts_idx | Horizontal directional transform core | Vertical directional transform core | Horizontal directional transform core | Vertical directional transform core |
| 0 | DST7 | DST7 | DCT8 | DCT8 |
| 1 | DCT8 | DST7 | DST7 | DCT8 |
| 2 | DST7 | DCT8 | DCT8 | DST7 |
| 3 | DCT8 | DCT8 | DST7 | DST7 |

TABLE 11

| mts_idx mts_idx | INTRA | | INTER | |
|---|---|---|---|---|
| | Horizontal directional transform core | Vertical directional transform core | Horizontal directional transform core | Vertical directional transform core |
| 0 | DCT8 | DST7 | DST7 | DCT8 |
| 1 | DST7 | DCT8 | DCT8 | DST7 |
| 2 | DST7 | DST7 | DST7 | DST7 |
| 3 | DCT8 | DCT8 | DST7 | DST7 |

A transform type may be determined based on the number of non-zero coefficients in the horizontal direction or the number of non-zero coefficients in the vertical direction of the current block. In this connection, the number of the non-zero coefficients in the horizontal direction indicates the number of non-zero coefficients included in 1×N (N is a width of the current block), and the number of the non-zero coefficients in the vertical direction indicates the number of non-zero coefficients included in N×1 (N is a height of the current block). When a maximum value of the number of the non-zero coefficients in the horizontal direction is smaller than or equal to a threshold, a first transform type may be applied to the horizontal direction, and when the maximum value of the number of the non-zero coefficients in the horizontal direction is greater than the threshold, a second transform type may be applied to the horizontal direction. When a maximum value of the number of the non-zero coefficients in the vertical direction is smaller than or equal to a threshold, the first transform type may be applied to the vertical direction, and when the maximum value of the number of the non-zero coefficients in the vertical direction is greater than the threshold, the second transform type may be applied to the vertical direction.

FIG. 20 is a diagram for describing an example in which a transform type of a current block is determined.

In one example, when the current block is encoded using intra prediction, and the maximum value of the number of the non-zero coefficients in the horizontal direction of the current block is equal to or smaller than 2 (refer to (a) of FIG. 20), the transform type in the horizontal direction may be determined as DST7.

When the current block is encoded using intra prediction and the maximum value of the number of the non-zero coefficients in the vertical direction of the current block is greater than 2 (see (b) in FIG. 20), DCT2 or DCT8 may be determined as the transform type in the vertical direction.

Information indicating whether to explicitly determine the transform type of the current block based on information signaled in a bitstream may be signaled in a bitstream. In one example, at a sequence level, information sps_explicit_intra_mts_flag indicating whether the explicit transform type determination for a block encoded using intra prediction is allowed may be signaled, and/or information sps_explicit_inter_mts_flag indicating whether explicit transform type determination for a block encoded using inter prediction is allowed may be signaled.

When the explicit transform type determination is allowed, the transform type of the current block may be determined based on index information tu_mts_idx signaled in a bitstream. To the contrary, when the explicit transform type determination is not allowed, the transform type of the current block may be determined based on at least one of the size or the shape of the current block, whether the current block is allowed to be transformed on a sub-block basis, or a position of a sub-block including a non-zero transform coefficient. In one example, the horizontal directional transform type of the current block may be determined based on the width of the current block, and the vertical directional transform type of the current block may be determined based on the height of the current block. For example, if the width of the current block is smaller than 4 or greater than 16, the transform type in the horizontal direction may be determined as DCT2. If else, the transform type in the horizontal direction may be determined as DST7. If the height of the current block is smaller than 4 or greater than 16, the transform type in the vertical direction may be determined as DCT2. If else, the transform type in the vertical direction may be determined as DST7. In order to determine the transform type in the horizontal direction and the transform type in the vertical direction, a threshold to be compared with the width and the height may be determined based on at least one of the size, or the shape of the current block or the intra prediction mode for the current block.

Alternatively, when the current block has a square shape in which the height and the width are equal to each other, the horizontal directional transform type and the vertical directional transform type are set to be the same as each other. To the contrary, when the current block has a non-square shape in which a height and a width thereof are not equal to each other, the horizontal directional transform type and the vertical directional transform type may be set to be different from each other. In one example, when the width of the current block is greater than the height thereof, the transform type in the horizontal direction may be determined as DST7, and the transform type in the vertical direction may be determined by DCT2. When the height of the current block is greater than the width thereof, the transform type in the vertical direction may be determined as DST7, while the transform type in the horizontal direction may be determined as DCT2.

The number and/or the type of the transform type candidates and/or the number and/or the type of the transform type combination candidates may vary depending on whether the explicit transform type determination is allowed. In one example, when the explicit transform type determination is allowed, DCT2, DST7 and DCT8 may be used as the transform type candidates. Accordingly, each of the horizontal directional transform type and the vertical directional transform type may be set to DCT2, DST8, or DCT8. When the explicit transform type determination is not allowed, only DCT2 and DST7 may be used as the transform type candidates. Accordingly, each of the horizontal directional transform type and the vertical directional transform type may be set to DCT2 or DST7.

When transform and quantization are performed by the encoder, the decoder may obtain the residual block via inverse-quantization and inverse-transform. The decoder may add the prediction block and the residual block to each other to obtain the reconstructed block for the current block.

When the reconstructed block of the current block is obtained, loss of information as occurring in the process of the quantization and encoding may be reduced via the in-loop filtering. The in-loop filter may include at least one of a deblocking filter, a sample adaptive offset filter (SAO), or an adaptive loop filter (ALF).

Applying the embodiments as described about the decoding process or the encoding process to the encoding process or the decoding process respectively may be included in the scope of the present disclosure. Within the scope of the present disclosure, the embodiments in which operations occur in a predetermined order may be modified to embodiments in which the operations occur in a different order from the predetermined order.

Although the above-described embodiment is described based on a series of the operations or the flowchart, the embodiment does not limit a time-series order of the operations of the method thereto. In another example, the operations may be performed simultaneously or in a different order therefrom as necessary. Further, in the above-described embodiment, each of the components (for example, a unit, a module, etc.) constituting the block diagram may be implemented in a form of a hardware device or software. A plurality of components may be combined with each other into a single component which may be implemented using a single hardware device or software. The above-described embodiment may be implemented using program instructions that may be executed via various computer components. The instructions may be recorded in a computer-readable storage medium. The computer-readable storage medium may contain therein program instructions, data files, data structures, or the like alone or in combination with each other. Examples of the computer-readable storage media include magnetic media such as hard disks, floppy disks, and magnetic tapes, optical storage media such as CD-ROMs, DVDs, and magneto-optical media such as floptical disks, and hardware devices such as ROM, RAM, flash memory, and the like specifically configured to store therein and execute the program instructions. The hardware device may be configured to operate as one or more software modules to perform processing according to the present disclosure, and vice versa.

INDUSTRIAL AVAILABILITY

The present disclosure may be applied to an electronic device that encodes/decodes video.

What is claimed is:
1. A video decoding method comprising:
determining a reference sample line for a current block;
deriving an intra prediction mode for the current block; and
performing intra prediction of the current block, based on the reference sample line and the intra prediction mode,
wherein the intra prediction mode is derived based on at least one of a first mode or a most probable mode (MPM) list,
determining whether to parse a flag indicating whether the intra prediction mode is identical with the first mode based on an index of the reference sample line, wherein determining whether to parse the flag comprises:
parsing the flag when the index of the reference sample line indicates an adjacent reference sample line, and
refraining from parsing the flag when the index of the reference sample line indicates a non-adjacent reference sample line,
wherein when the flag is parsed and the flag indicates that the intra prediction mode is identical with the first mode, the intra prediction of the current block is derived without reference to the MPM list, and
wherein when the flag is not parsed, the intra prediction mode is derived without reference to the flag.
2. The method of claim 1, wherein deriving the intra prediction mode further includes parsing an MPM flag, wherein when the MPM flag indicates that an MPM identical with the intra prediction mode is present in the MPM list, a number of intra prediction mode candidates which can be set as the intra prediction mode is a pre-determined number.
3. The method of claim 2, wherein the pre-determined number is five.
4. The method of claim 1, wherein when a first intra prediction mode for a top neighboring block adjacent to a top of the current block and a second intra prediction mode for a left neighboring block adjacent to a left of the current block are different from each other, and each of the first intra prediction mode and the second intra prediction mode is a directional intra prediction mode, the MPM list includes an intra prediction mode candidate derived by adding or subtracting 2 to or from a maximum value of the first intra prediction mode and the second intra prediction mode.
5. The method of claim 1, wherein the first mode is a planar mode.
6. A video encoding method comprising:
determining a reference sample line for a current block;
deriving an intra prediction mode for the current block; and
performing intra prediction of the current block, based on the reference sample line and the intra prediction mode,
wherein the intra prediction mode is derived based on at least one of a first mode or a most probable mode (MPM) list,
determining whether to encode a flag indicating whether the intra prediction mode is identical with the first mode based on an index of the reference sample line, wherein determining whether to parse the flag comprises:
encoding the flag when the index of the reference sample line indicates an adjacent reference sample line, and
refraining from encoding the flag when the index of the reference sample line indicates a non-adjacent reference sample line,
wherein when the flag is encoded and indicates that the intra prediction mode is identical with the first mode, the intra prediction of the current block is to be derived without reference to the MPM list,
wherein when the flag is not encoded, the intra prediction mode is to be derived without reference to the flag.
7. The method of claim 6, wherein deriving the intra prediction mode further includes encoding an MPM flag, wherein when the MPM flag indicates that an MPM identical with the intra prediction mode is present in the MPM list, a number of intra prediction mode candidates which can be set as the intra prediction mode is a pre-determined number.
8. The method of claim 7, wherein the pre-determined number is five.
9. The method of claim 6, wherein when a first intra prediction mode for a top neighboring block adjacent to a top of the current block and a second intra prediction mode for a left neighboring block adjacent to a left of the current block are different from each other, and each of the first intra prediction mode and the second intra prediction mode is a directional intra prediction mode, the MPM list includes an intra prediction mode candidate derived by adding or subtracting 2 to or from a maximum value of the first intra prediction mode and the second intra prediction mode.
10. The method of claim 6, wherein the first mode is a planar mode.

11. A video decoding device comprising an intra prediction unit configured to:
    determine a reference sample line for a current block;
    derive an intra prediction mode for the current block; and
    perform intra prediction of the current block, based on the reference sample line and the intra prediction mode,
    wherein the intra prediction mode is derived based on at least one of a first mode or a most probable mode (MPM) list,
    determine whether to parse a flag indicating whether the intra prediction mode is identical with the first mode based on an index of the reference sample line, wherein determining whether to parse the flag comprises:
    parsing the flag when the index of the reference sample line indicates an adjacent reference sample line, and
    refraining from parsing the flag when the index of the reference sample line indicates a non-adjacent reference sample line,
    wherein when the flag is parsed and the flag indicates that the intra prediction mode is identical with the first mode, the intra prediction of the current block is derived without reference to the MPM list, and
    wherein when the flag is not parsed, the intra prediction mode is derived without reference to the flag.

12. The video decoding device of claim 11, wherein deriving the intra prediction mode further includes parsing an MPM flag,
    wherein when the MPM flag indicates that an MPM identical with the intra prediction mode is present in the MPM list, a number of intra prediction mode candidates which can be set as the intra prediction mode is a pre-determined number.

13. The video decoding device of claim 12, wherein the pre-determined number is five.

14. The video decoding device of claim 11, wherein when a first intra prediction mode for a top neighboring block adjacent to a top of the current block and a second intra prediction mode for a left neighboring block adjacent to a left of the current block are different from each other, and each of the first intra prediction mode and the second intra prediction mode is a directional intra prediction mode, the MPM list includes an intra prediction mode candidate derived by adding or subtracting 2 to or from a maximum value of the first intra prediction mode and the second intra prediction mode.

15. The video decoding device of claim 11, wherein the first mode is a planar mode.

* * * * *